(12) United States Patent
Ajima et al.

(10) Patent No.: US 9,831,814 B2
(45) Date of Patent: Nov. 28, 2017

(54) ELECTRIC MOTOR DRIVE CONTROL DEVICE, ELECTRICALLY DRIVEN POWER STEERING DEVICE, ELECTRICALLY DRIVEN BRAKE DEVICE, AND ELECTRICALLY DRIVEN PUMP DEVICE

(71) Applicant: Hitachi Automotive Systems, Ltd., Hitachinaka-shi, Ibaraki (JP)

(72) Inventors: Toshiyuki Ajima, Tokyo (JP); Mitsuo Sasaki, Hitachinaka (JP); Shigehisa Aoyagi, Tokyo (JP); Tomonobu Koseki, Hitachinaka (JP); Tomio Sakashita, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 290 days.

(21) Appl. No.: 14/832,057

(22) Filed: Aug. 21, 2015

(65) Prior Publication Data

US 2016/0094180 A1 Mar. 31, 2016

(30) Foreign Application Priority Data

Sep. 29, 2014 (JP) ................................. 2014-198238

(51) Int. Cl.
*H02P 27/08* (2006.01)
*B60T 13/74* (2006.01)
(Continued)

(52) U.S. Cl.
CPC .............. *H02P 27/08* (2013.01); *B60T 7/042* (2013.01); *B60T 13/166* (2013.01); *B60T 13/662* (2013.01); *B60T 13/686* (2013.01);

*B60T 13/745* (2013.01); *B62D 5/065* (2013.01); *H02P 29/024* (2013.01); *H02P 29/0243* (2016.02);

(Continued)

(58) Field of Classification Search
USPC .......................... 318/430–434, 491, 495, 496
See application file for complete search history.

(56) References Cited

U.S. PATENT DOCUMENTS

| 8,049,455 B2 * | 11/2011 | Kitanaka | ................ B60L 3/003 318/563 |
| 2007/0241720 A1 * | 10/2007 | Sakamoto | ............... H02P 27/08 318/811 |

(Continued)

FOREIGN PATENT DOCUMENTS

JP 2013-247754 A 12/2013

*Primary Examiner* — Bentsu Ro
(74) *Attorney, Agent, or Firm* — Crowell & Moring LLP

(57) ABSTRACT

An electric motor drive control device includes: an inverter circuit that converts DC power inputted via a DC bus to multiphase AC power and outputs the multiphase AC power to an electric motor; a current detector that detects a DC current flowing in the DC bus; a PWM generator that generates PWM signals and outputs the PWM signals to the inverter circuit; a current calculator that calculates a current value for each of phases to be flowed to the electric motor based upon a value of the DC current and the PWM signals; and a current controller that generates a command signal based upon the current value, and outputs the command signal to the PWM generator, wherein: if one of the phases of the AC power has become missing, the current calculator determines which phase is one that has become missing and calculates current values for other phases.

10 Claims, 16 Drawing Sheets

(51) Int. Cl.
  *B60T 7/04* (2006.01)
  *B60T 13/16* (2006.01)
  *B60T 13/66* (2006.01)
  *B60T 13/68* (2006.01)
  *B62D 5/065* (2006.01)
  *H02P 29/024* (2016.01)
  *F04D 25/06* (2006.01)
  *B62D 5/04* (2006.01)
  *H02P 6/18* (2016.01)

(52) U.S. Cl.
  CPC .......... *B62D 5/0484* (2013.01); *B62D 5/0487* (2013.01); *F04D 25/06* (2013.01); *H02P 6/187* (2013.01)

(56) References Cited

U.S. PATENT DOCUMENTS

2012/0256572 A1* 10/2012 Oyori .................... H02P 29/032
 318/400.22
2013/0314013 A1* 11/2013 Ajima .................... H02P 23/00
 318/400.21

* cited by examiner

FIG.4

| VOLTAGE VECTOR | PWM PATTERN (U, V, W) | NEUTRAL POINT VOLTAGE DURING NORMAL CONDITIONS | NEUTRAL POINT VOLTAGE WHEN U PHASE MISSING | NEUTRAL POINT VOLTAGE WHEN V PHASE MISSING | NEUTRAL POINT VOLTAGE WHEN W PHASE MISSING |
|---|---|---|---|---|---|
| V0 | (0, 0, 0) | 0 | 0 | 0 | 0 |
| V1 | (1, 0, 0) | VB/3 | 0 | VB/2 | VB/2 |
| V2 | (1, 1, 0) | VB*2/3 | VB/2 | VB/2 | VB |
| V3 | (0, 1, 0) | VB/3 | VB/2 | 0 | VB/2 |
| V4 | (0, 1, 1) | VB*2/3 | VB | VB/2 | VB/2 |
| V5 | (0, 0, 1) | VB/3 | VB/2 | VB/2 | 0 |
| V6 | (1, 0, 1) | VB*2/3 | VB/2 | VB | VB/2 |
| V7 | (1, 1, 1) | VB | VB | VB | VB |

FIG.9

| VOLTAGE VECTOR | PWM PATTERN (U, V, W) | MOTOR CURRENT | DC CURRENT DURING NORMAL CONDITIONS | DC CURRENT WHEN U PHASE MISSING | DC CURRENT WHEN V PHASE MISSING | DC CURRENT WHEN W PHASE MISSING |
|---|---|---|---|---|---|---|
| V0 | (0, 0, 0) | 0=Iu+Iv+Iw | 0 | 0 | 0 | 0 |
| V1 | (1, 0, 0) | Iu=−(Iv+Iw) | Iu | Iu=0 | Iu | Iu |
| V2 | (1, 1, 0) | −Iw=Iu+Iv | −Iw | −Iw | −Iw | Iw=0 |
| V3 | (0, 1, 0) | Iv=−(Iu+Iw) | Iv | Iv | Iv=0 | Iv |
| V4 | (0, 1, 1) | −Iu=Iv+Iw | −Iu | Iu=0 | −Iu | −Iu |
| V5 | (0, 0, 1) | Iw=−(Iu+Iv) | Iw | Iw | Iw | Iw=0 |
| V6 | (1, 0, 1) | −Iv=Iu+Iw | −Iv | −Iv | Iv=0 | −Iv |
| V7 | (1, 1, 1) | 0=Iu+Iv+Iw | 0 | 0 | 0 | 0 |

ELECTRIC MOTOR DRIVE CONTROL DEVICE, ELECTRICALLY DRIVEN POWER STEERING DEVICE, ELECTRICALLY DRIVEN BRAKE DEVICE, AND ELECTRICALLY DRIVEN PUMP DEVICE

INCORPORATION BY REFERENCE

The disclosure of the following priority application is herein incorporated by reference: Japanese Patent Application No. 2014-198238, filed Sep. 29, 2014.

BACKGROUND OF THE INVENTION

1. Field of the Invention

The present invention relates to an electric motor drive control device, and to an electrically driven power steering device, an electrically driven brake device, and an electrically driven pump device that employ such an electric motor drive control device.

2. Description of Related Art

Generally an electric motor drive device for controlling the driving of an electric motor includes a power conversion device that receives DC power from a DC power supply and generates AC power, and a control device for controlling this power conversion device. The AC power that is obtained from the power conversion device is supplied to the electric motor (that, for example, may be a synchronous three phase electric motor), and the electric motor generates rotational torque according to this AC power that is supplied thereto.

This type of electric motor drive device may be employed, for example for controlling the driving of an electric motor of some type that is mounted to an automobile. As one example of this, an electric motor drive device that is used to drive an electric motor in an electrically driven power steering device that supplements steering action for the automobile, or that powers one or more vehicle wheels in order to propel the automobile, or the like, may be arranged to drive control such a system device by converting DC power received from a secondary battery mounted to the automobile into AC power and by supplying this AC power to the corresponding electric motor. Since these applications are per se well known, further explanation thereof will herein be omitted.

With an electric motor drive device of the type described above, if an anomaly occurs upon one of the output lines, including both the wiring from the switching elements of the power conversion device to the electric motor and also the windings of the electric motor, then it is desirable to detect this anomaly in an appropriate manner, and to stop the operation of the electric motor and of the power conversion device safely. In order to satisfy this type of requirement, in Japanese Laid Open Patent Publication No. 2013-247754 described below, a technique is described for detecting an anomaly such as a ground fault or the like upon an output line by detecting the neutral point voltage of the electric motor, and by comparing this detected neutral point voltage with a predetermined threshold value.

SUMMARY OF THE INVENTION

With the technique disclosed in Japanese Laid Open Patent Publication No. 2013-247754, if an anomaly such as a ground fault or the like has occurred in one of the three phase output lines that are provided to correspond to the three phases of the electric motor, then, although it is possible to detect this fact, it is difficult to continue driving the electric motor in a safe manner. In particular, with an electric motor drive device such as the one described in Japanese Laid Open Patent Publication No. 2013-247754 in which the electric motor is drive controlled by calculating the currents flowing in each of the three phases of the three phase electric motor from the DC current in pulse form that is flowing to the power conversion device, then, if one phase becomes missing due to one of the output lines for one of the three phases going open circuit or the like, disagreement occurs between the PWM pulse pattern outputted from the control device to the power conversion device and the actual current route. Due to this, it becomes impossible to calculate the currents for the electric motor correctly, and it becomes impossible to continue driving the electric motor in a safe manner.

The present invention has been conceived in order to solve problems such as described above in connection with the prior art. Thus, the object of the present invention is to provide an electric motor drive control device that, while driving an electric motor that is driven by receiving multi phase AC power, is capable of continuing to drive the electric motor safely even if one of the phases has become missing.

According to the 1st aspect of the present invention, an electric motor drive control device controls operation of an electric motor, and comprises: an inverter circuit that converts DC power inputted via a DC bus to multiphase AC power and outputs the multiphase AC power to the electric motor; a current detector that detects a DC current flowing in the DC bus; a PWM generator that generates PWM signals for controlling the inverter circuit, and outputs the PWM signals to the inverter circuit; a current calculator that calculates a current value for each of phases to be flowed to the electric motor based upon a value of the DC current detected by the current detector and the PWM signals; and a current controller that generates a command signal for controlling the PWM generator based upon the current value for each of the phases calculated by the current calculator, and outputs the command signal to the PWM generator, wherein: if one of the phases of the AC power has become missing, the current calculator determines which phase is one that has become missing and calculates current values for other phases.

According to the 2nd aspect of the present invention, an electrically driven power steering device comprises: an electric motor drive control device described above; a transmission mechanism that transmits steering actuation by a driver of a vehicle to a steered wheel of the vehicle; and an electric motor that is driven under control of the electric motor drive control device, and that generates rotational torque for assisting the steering actuation.

According to the 3rd aspect of the present invention, an electrically driven brake device comprises: an electric motor drive control device described above; a transmission mechanism that transmits brake actuation by a driver of a vehicle to a braking mechanism of the vehicle via a working fluid; and an electric motor that is driven under control of the electric motor drive control device, and that generates rotational torque for increasing a pressure of the working fluid according to the brake actuation.

According to the 4th aspect of the present invention, an electrically driven pump device comprises: an electric motor drive control device described above; a pump that increases a pressure of a working fluid; and an electric motor that is driven under control of the electric motor drive control device, and that generates rotational torque for operating the pump.

BRIEF DESCRIPTION OF THE DRAWINGS

FIG. 4 is a list table showing the relationship between the output voltage vectors and the neutral point voltage, during normal conditions and also when each of the phases has become missing;

FIG. 9 is a list table showing the relationship between the output voltage vectors and the DC current, during normal conditions and also when each of the phases has become missing;

DESCRIPTION OF EMBODIMENTS

In the following, embodiments of the electric motor drive control device according to the present invention will be explained in detail with reference to the drawings.

Embodiment #1

Figure 1:
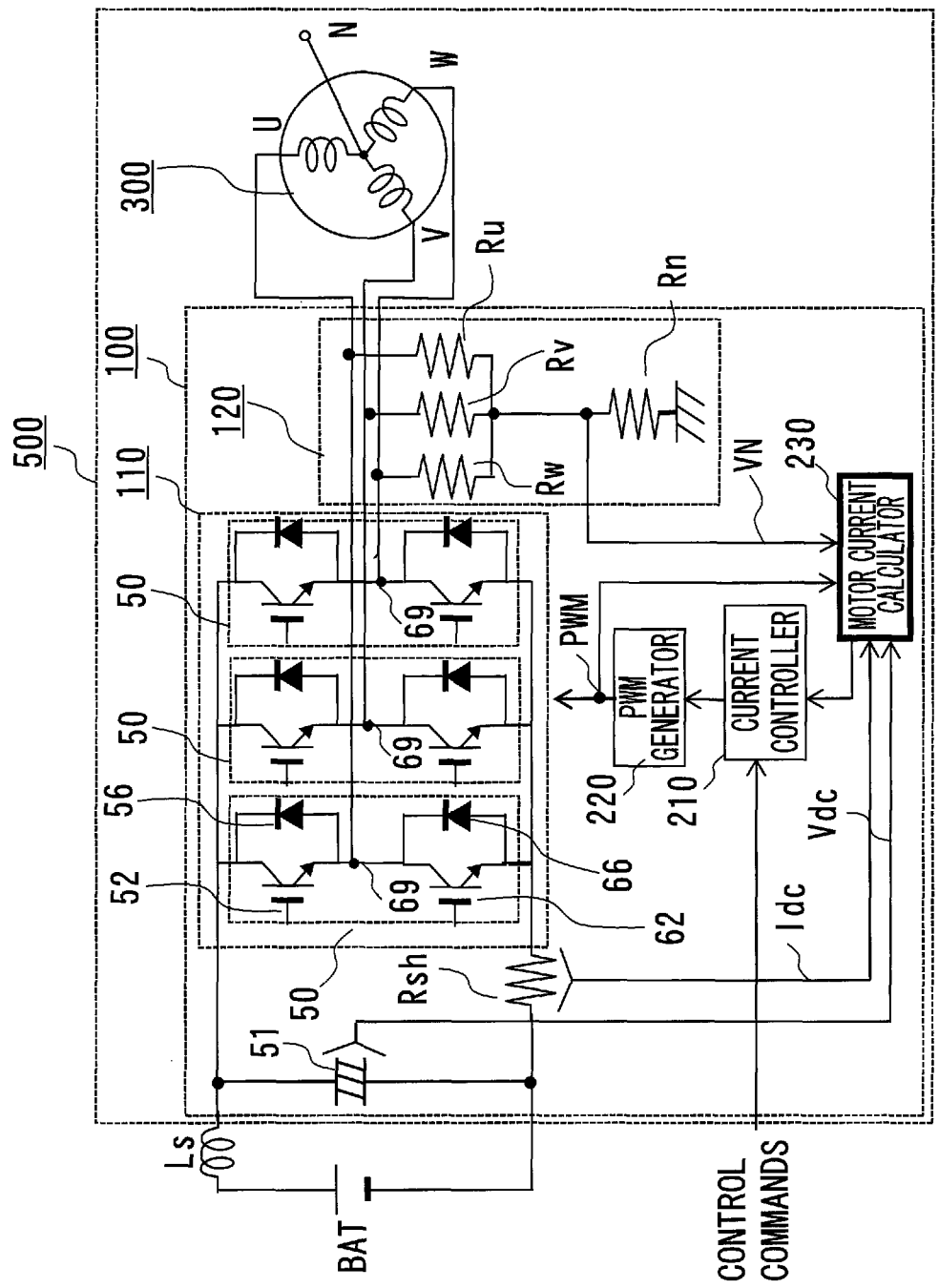
FIG. 1 is a figure showing the structure of an electric motor drive control device according to a first embodiment of the present invention.

FIG. 1 is a figure showing the structure of an electric motor drive control device according to a first embodiment of the present invention. Here, as an example of an electric motor drive control device, the structure of an electric motor drive control device that is employed in an electrically driven power steering device for a vehicle is shown.

In FIG. 1, the electrically driven power steering device 500 comprises an electric motor 300, and an inverter device 100 which works as an electric motor drive control device that controls the operation of the motor 300.

In this embodiment, by monitoring the neutral point voltage of the motor 300, the inverter device 100 detects any anomaly in the output lines, including the wiring to the motor 300 from the switching elements of the inverter device 100 and the windings of the motor 300. It should be understood that, for the structure of the electrically driven power steering device 500, the inverter device 100 and the electric motor 300 are shown in FIG. 1, but other mechanical components and so on constituting the vehicle steering system are not shown, since they are not directly related to the operation of the inverter device 100.

The inverter device 100 comprises a current controller 210, a PWM generator 220, an inverter circuit 110, a neutral point voltage detection circuit 120, and a motor current calculator 230. The motor current calculator 230 determines whether or not any anomaly is taking place upon the output lines, and outputs the result of calculation of the motor currents during normal conditions if there is no anomaly. On the other hand, if an anomaly has occurred, then the motor current calculator 230 determines which is the phase is the one that is anomalous, and, along with outputting results of calculation of motor current in which corrected currents are calculated while taking account of the fact that this phase is anomalous and so on, also operation is performed to issue a notification to the user.

A battery BAT that outputs a DC voltage VB is connected to the inverter device 100 as a DC power supply. This DC power inputted to the inverter device 100 via DC buses (bus bars) from the battery power supply BAT, is converted by the inverter circuit 110 into three phase AC power of variable voltage and variable frequency, and is outputted to the electric motor 300.

The electric motor 300 is a three phase electric motor that is rotationally driven by the three phase AC power supplied from the inverter circuit 110. Any AC electric motor of various types may be employed as this electric motor 300; for example, a synchronous permanent magnet motor, an induction motor, a switched reluctance (SR) motor, or the like may be used.

The inverter device 100 has a current control function for controlling the rotational output of the electric motor 300. As shown in FIG. 1, a current detector Rsh is provided to the minus side DC bus of the inverter device 100 for detecting the DC current flowing in this DC bus. It should be understood that this current detector Rsh could alternatively be provided to the plus side DC bus, rather than to the minus side DC bus. The DC current value Idc detected by this current detector Rsh is inputted to the motor current calculator 230.

PWM signals outputted from the PWM generator 220 are inputted to the motor current calculator 230 for driving the switching elements of the inverter circuit 110. On the basis of these PWM signals and the DC current value Idc inputted from the current detector Rsh, the motor current calculator 230 calculates and obtains current values (Iu, Iv, and Iw) for the U phase, the V phase, and the W phase to be flowed to the electric motor 300, and outputs the results of these calculations to the current controller 210.

It should be understood that, in addition to the current calculation function described above, the motor current calculator 230 also has a function, if any one of the phases of the three phase AC power outputted from the inverter circuit 110 to the electric motor 300 has become missing, of determining the missing phase and calculating current values for the other two phases. This feature will be explained later in detail. It should be understood that the missing phase means that the phase has disappeared or become zero due to open-circuit or the like. The missing phase or phase missing can be paraphrased by "deficient phase" or "phase deficiency".

On the basis of the three phase current values Iu, Iv, and Iw calculated by the motor current calculator 230, the current controller 210 generates command signals for controlling the PWM generator 220, and outputs these command signals to the PWM generator 220. In concrete terms, the current controller 210 obtains three phase voltage command values (Vu*, Vv*, and Vw*) such that the respective differences between the three phase current values Iu, Iv, and Iw and those of control commands such as current control commands or the like inputted from external devices all become zero, generates command signals specifying these voltage command values, and outputs these command signals to the PWM generator 220. It should be understood that, instead of employing three phase current values Iu, Iv, and Iw, it would be equally acceptable for the current controller 210 to generate command signals to the PWM generator 220 by employing current values (Id, Iq) that have been dq converted from the current values Iu, Iv, and Iw by using the rotational position θ of the electric motor 300.

On the basis of the three phase voltage command values (Vu*, Vv*, Vw*) specified by the command signal inputted from the current controller 210, the PWM generator 220 generates PWM signals for controlling the inverter circuit 110, and outputs these PWM signals to the inverter circuit 110. In concrete terms, the PWM generator 220 obtains pulse widths for the various phases respectively corresponding to the voltage command values (Vu*, Vv*, Vw*), generates PWM signals corresponding to these pulse widths, and outputs these PWM signals to switching elements of the respective phases in the inverter circuit 110. Due to this, switching elements in the inverter circuit 110 for each of the phases are controlled to go ON and OFF, and thereby the output voltages of the inverter circuit 110 are adjusted.

Next, the schematic structure of the inverter circuit 110 will be explained. It should be understood that while, in the following, an example is explained in which insulated gate type bipolar transistors (i.e. IGBTs) are used as power switching semiconductor elements for the inverter circuit 110, it would also be acceptable to employ MOSFETs or the like, instead of IGBTs.

Series circuits 50 in the inverter circuit 110, each consisting of an upper arm and a lower arm, include IGBTs 52 and diodes 56 that operate as the upper arms and IGBTs 62 and diodes 66 that operate as the lower arms. The inverter circuit 110 comprises three of these series circuits 50, respectively corresponding to the U phase, the V phase, and the W phase of the three phase AC power that is to be outputted.

The series circuit 50 for each of the phases corresponds to a respective armature winding of the electric motor 300 provided for each phase, and outputs AC current from its respective intermediate electrode 69. The intermediate electrodes 69 are electrically connected to the corresponding phase windings of the electric motor 300 via AC terminals. In the following, these lines including these connections from the intermediate electrode 69 of each phase to the corresponding winding are termed the "output lines".

In the series circuit 50 for each of the phases, the collector electrode of the IGBT 52 of the upper arm is electrically connected to the positive electrode side of the battery power supply BAT via a positive terminal, and moreover the emitter electrode of the IGBT 62 of the lower arm is electrically connected to the negative electrode side of the battery power supply BAT via a negative terminal. Each of the IGBTs 52 and 62 of the upper arm and the lower arm for each of the phases is drive controlled by a corresponding ON/OFF signal (i.e. a PWM signal) generated by the PWM generator 220. As a result, the DC power supplied from the battery power supply BAT is converted into three phase AC power that is outputted to the windings of the electric motor 300 corresponding to each of the phases, so that the electric motor 300 is driven and rotates.

Although the schematic structure of the inverter circuit 110 is only outlined in the above description, further explanation thereof will be omitted, since this type of structure is per se well known.

It should be understood that, when controlling the rotational speed of the electric motor 300, it will be acceptable to perform feedback control by generating voltage commands or current commands so that the rotational speed wr of the electric motor agrees with a speed command sent from a higher ranking controller.

Next, the operation of the neutral point voltage detection circuit 120 and the anomaly determination and the calculation of corrected currents performed by the motor current calculator 230 will be explained in the following, these being the special features of the present invention.

The neutral point voltage detection circuit 120 is a circuit for setting a virtual neutral point that is equivalent in electrical potential to the neutral point of the electric motor 300 on the basis of the three phase output voltages of the inverter circuit 110, and for detecting the neutral point voltage VN of the electric motor 300 by detecting the voltage of this virtual neutral point. In concrete terms, as shown in FIG. 1, this neutral point voltage detection circuit 120 is built up by, on the output line for each of the phases, connecting the one end of a respective resistor Ru, Rv, and Rw between the intermediate electrode 69 for that phase and the corresponding winding of the electric motor 300, and by connecting the other ends of these resistors to ground via a common resistor Rn. With this structure, it becomes possible to detect the neutral point voltage VN of the electric motor 300 due to a voltage that is the average of the output voltages of the three phases being voltage divided by the resistors Ru, Rv and Rw and the resistor Rn. The value of this voltage VN that is detected by the neutral point voltage detection circuit 120 is inputted to the motor current calculator 230, and is employed in the anomaly detection performed by the motor current calculator 230.

It should be understood that, in this embodiment, since the inverter device 100 is one that is equipped to the electrically driven power steering device 500, and accordingly the voltage of the battery power supply BAT is 12 V, this is comparatively low. Due to this, as shown in FIG. 1, the resistors Ru, Rv, and Rw of the neutral point voltage detection circuit 120 are directly connected to the output lines of the corresponding phases. However the present invention could also be applied to driving an electric motor for powering a vehicle wheel, as for example in the case of an inverter device that is mounted to a hybrid vehicle, and such a motor is driven at a comparatively high voltage. In this case it is desirable to detect the neutral point voltage indirectly by using an insulation circuit or the like.

Furthermore, it is desirable for the neutral point voltage VN detected by the neutral point voltage detection circuit 120 to be inputted to the motor current calculator 230 after having been standardized to a predetermined voltage level, so that it can be processed by the motor current calculator 230. For example if the neutral point voltage VN is to be digitally processed by the motor current calculator 230, then the output voltage for each phase should be divided by the neutral point voltage detection circuit 120 so as to be brought to the level of 0~5 V, which is a typical input level for an A/D converter. The motor current calculator 230 acquires the neutral point voltage VN by modifying this voltage signal that has been divided, and uses it for anomaly determination. Moreover, there would also be no problem if a voltage that has been amplified by an op amp and then impedance converted is used as the neutral point voltage VN.

The motor current calculator 230 has the function of detecting anomaly upon the output lines for the respective phases on the basis of the neutral point voltage VN detected by the neutral point voltage detection circuit 120. In concrete terms, the motor current calculator 230 compares together the value of the neutral point voltage VN detected by the neutral point voltage detection circuit 120 and the theoretical value of the neutral point voltage of the electric motor 300, and makes a decision as to whether or not there is an anomaly upon the output line for any of the phases on the basis of the result of this comparison. Here, the theoretical value of the neutral point voltage VN means the proper neutral point voltage VN when the inverter device 100 and the electric motor 300 are operating according to design. In the following explanation, the theoretical value that is used for comparison with the neutral point voltage VN will be termed the "proper neutral point voltage VNR".

The proper neutral point voltage VNR described above is obtained by the motor current calculator 230 on the basis of the pulse pattern of the PWM signals outputted from the PWM generator 220. In concrete terms, as shown in FIG. 1, the voltage Vdc between the two ends of a smoothing capacitor 51 that is connected in parallel with the battery power supply BAT is detected, and this voltage Vdc is inputted to the motor current calculator 230. And, on the basis of this voltage Vdc that has been inputted, the motor current calculator 230 is able to obtain the voltage VB of the battery power supply BAT (i.e. the battery voltage), and is able to obtain the proper neutral point voltage VNR by adjusting this battery voltage VB according to the pulse pattern of the PWM signals. For example, the motor current calculator 230 may specify the output voltage vector of the inverter circuit 110 on the basis of the pulse pattern of the PWM signals, and, according to this output voltage vector, may select whether to multiply the battery voltage VB by unity, two thirds, or one third. It is possible for the motor current calculator 230 to obtain the proper neutral point voltage VNR by multiplying the battery voltage VB by a factor selected in this manner. It should be understood that this point will be explained later in detail.

Next, output voltage vectors that specify the output from the inverter circuit 110 according to the first embodiment will be explained with reference to FIG. 2. Moreover, the output line anomaly detection operation in this first embodiment will be explained with reference to FIG. 3. Furthermore, the operation in this first embodiment for detecting when the output line is open circuit will be explained with reference to FIG. 4.

Figure 2:
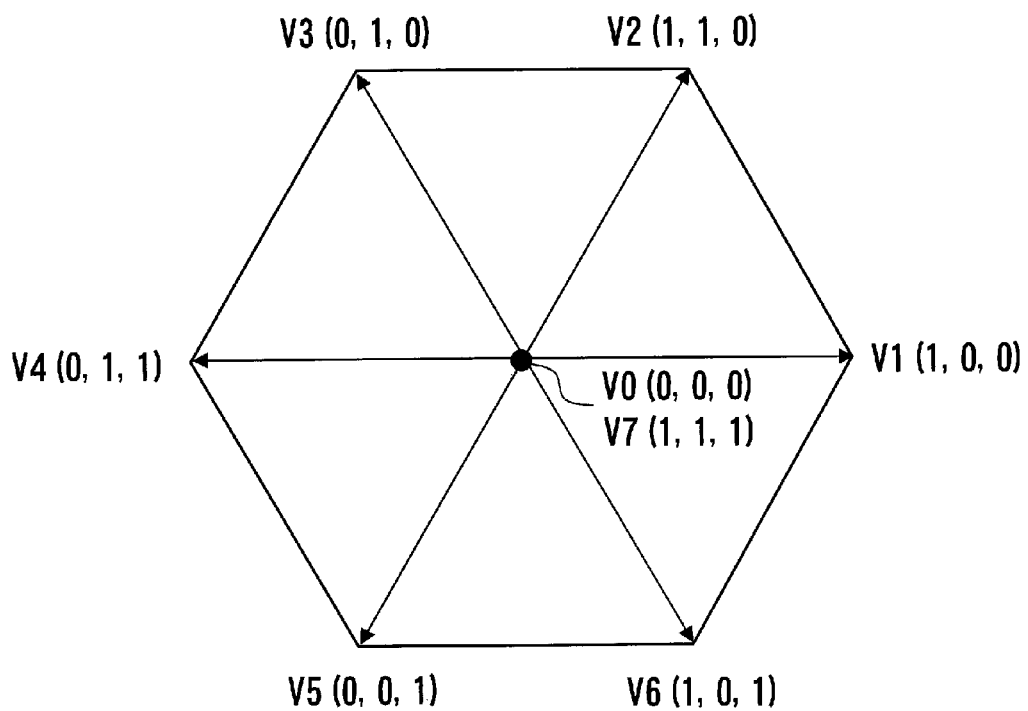
FIG. 2 is a figure showing output voltage vectors of an inverter circuit.

With the output voltage vector of the inverter circuit 110 shown in FIG. 2, in order for the U phase, the V phase, and the W phase, "1" is shown when the IGBT 52 that is the switching element of the upper arm is ON, and "0" is shown when the IGBT 62 that is the switching element of the lower arm is ON. As shown in FIG. 2, the output voltage vector of the inverter circuit 110 changes from the vector V0 through to the vector V7. Two combinations among these, i.e. V0 (0,0,0) and V7 (1,1,1), are zero vectors for which the currents flowing to the electric motor 300 are zero.

The output voltage vector of the inverter circuit 110 is determined according to the pulse pattern of the PWM signals outputted from the PWM generator 220. In this embodiment, as previously described, it is arranged for the motor current calculator 230 to specify the output voltage vector from the pulse pattern of the PWM signals, and to determine the proper neutral point voltage VNR as a threshold value for the previously described neutral point voltage VN. In other words, it is arranged for the motor current calculator 230 to use, as the level that is used for setting of a threshold value, one of: the voltage determined by the vector V7; the voltage determined by the vectors V2, V4, and V6; the voltage determined by the vectors V1, V3, and V5; and the voltage determined by the vector V0.

The neutral point voltage VN that appears due to the operation of the electric motor 300 necessarily changes stepwise in synchronism with the PWM pulse patterns. Accordingly, if the neutral point voltage VN that is detected by the neutral point voltage detection circuit 120 from the output voltages of the inverter circuit 110 and the proper neutral point voltage VNR that is determined from the pulse pattern of the PWM signals are compared together, then it is possible to determine whether the three output lines for the three phases are all normal, or an anomaly is occurring in any of the three phases.

If the output voltage vector of the inverter circuit 110 is the vector V2, the vector V4, or the vector V6, then the output voltages of two of the three phases of the inverter circuit 110 are the battery voltage VB, while the output voltage of the other phase is 0 volts. Accordingly, the value of the proper neutral point voltage VNR in this case becomes $VNR = VB \times 2/3$.

Moreover, if the output voltage vector of the inverter circuit 110 is the vector V1, the vector V3, or the vector V5, then the output voltage of one of the three phases of the inverter circuit 110 is the battery voltage VB, while the output voltages of the other two phases are 0 volts. Accordingly, the value of the proper neutral point voltage VNR in this case becomes $VNR = VB \times 1/3$.

If the output voltage vector of the inverter circuit is the vector V0, then the output voltages of all of the three phases of the inverter circuit 110 are 0 volts. Accordingly, the value of the proper neutral point voltage VNR in this case becomes $VNR = 0$.

In a similar manner, if the output voltage vector of the inverter circuit is the vector V7, then the output voltages of all of the three phases of the inverter circuit 110 are the battery voltage VB. Accordingly, the value of the proper neutral point voltage VNR in this case becomes $VNR = VB$.

Figure 3:
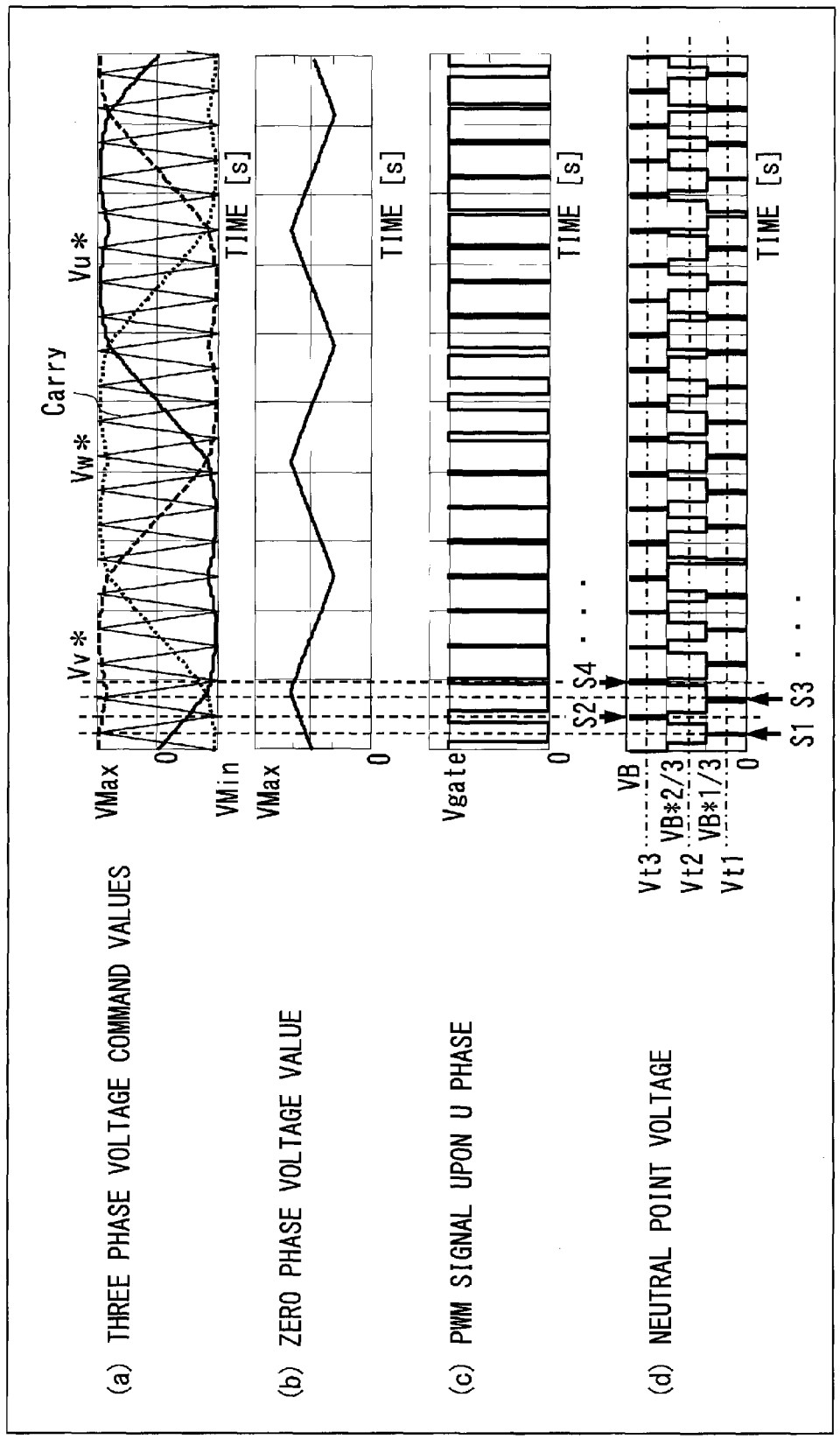
FIG. 3 is a waveform diagram for explanation of output line anomaly detection operation in this first embodiment.

In the waveform diagram shown in FIG. 3, with the three phase voltage command values shown at (a), all of the modulated waves (i.e. voltage command values) Vu*, Vv*, and Vw* of the three phases of the inverter circuit 110 are waveforms that include third harmonics (with the modulation ratio being 1.15). It should be understood that a PWM triangular wave carrier Carry, which is the carrier wave, is also shown at (a). As a result, the zero phase voltage shown at (b) becomes a waveform that includes a third harmonic, and also the zero phase voltage of (b) is superimposed upon the neutral point voltage waveform shown at (d).

The waveform of the PWM signal inputted to the upper arm of the U phase is shown at (c) in FIG. 3. This is the signal that drives the IGBT 52 that is the switching element of the U phase upper arm of the inverter circuit 110. It should be understood that the PWM signal for the U phase lower arm is the complementary signal (i.e. the inverse signal) to the PWM signal for the U phase upper arm shown at (c).

As shown at (c), when the value of the PWM signal for the U phase upper arm is Vgate (high level), then the IGBT 52 of the U phase upper arm goes to ON, and the U phase output voltage of the inverter circuit 110 becomes VB. Conversely, when the value of the PWM signal for the U phase upper arm is 0 (low level), then the IGBT 62 of the U phase lower arm goes to ON, and the U phase output voltage of the inverter circuit 110 becomes 0 volts.

Change of the neutral point voltage VN in synchronism with the PWM carrier Carry of (a) is shown at (d) in FIG. 3. This neutral point voltage VN gives the voltage values at the neutral point of the motor 300, from the vector V0 to the vector V7 in order. This is a combined voltage value that is the average of the output voltages Vu, Vv, and Vw of the three phases of the inverter circuit 110, and is given by the following Equation (1). This is equivalent to the value of the neutral point voltage VN detected by the neutral point voltage detection circuit 120.

$$VN=(Vu+Vv+Vw)/3 \quad (1)$$

The value of the neutral point voltage VN given by the above Equation (1) may be considered as having been detected by the neutral point voltage detection circuit 120 described above, and this neutral point voltage VN is a voltage that changes stepwise in synchronism with the pulse pattern of the PWM signals.

Next, consideration will be given to the case when one of the output lines of the inverter device 100 for one of the three phases becomes open circuit (this phase will subsequently be termed the "missing phase"). In this case, the neutral point voltage when the phase becomes missing can be detected as described below by using the lists shown in the Table of FIG. 4. FIG. 4 is a list table showing the relationship between the output voltage vectors and the neutral point voltage VN, both during normal conditions and when each of the phases has become missing.

During normal conditions when no phase has become missing, as shown in FIG. 4, the neutral point voltage VN is VB×⅓ or VB×⅔ for the vectors V1 through V6, 0 for the vector V0, and VB for the vector V7. On the other hand, if the phase upon one of the output lines has become missing, then, as shown in FIG. 4, the neutral point voltage VN for the vectors V1 through V6 will become one of 0, VB/2, or VB. Accordingly, if the value of the neutral point voltage VN detected by the neutral point voltage detection circuit 120 ever becomes VN=VB/2, then it is possible to determine that one of the phases has become missing.

When, by doing as described above, it has been determined that one of the phases has become missing, it is then possible to make a decision as to which of the phases is the one that has become missing by specifying, among the vectors V1 through V6, which are the vector or vectors for which the value of the neutral point voltage VN becomes 0 or VB. In concrete terms if, among the output voltage vectors V1, V3, and V5 for which only one of the phases is ON (1) while the other two phases are OFF (0), the neutral point voltage VN has become zero for one of them, then it is possible to determine that the phase for which this output voltage vector is ON is the phase that has become missing. In other words, it is possible to decide that the U phase is the one that has become missing if VN=0 for the vector V1; it is possible to decide that the V phase is the one that has become missing if VN=0 for the vector V3; and it is possible to decide that the W phase is the one that has become missing if VN=0 for the vector V5.

Moreover if, among the output voltage vectors V2, V4, and V6 for which only one of the phases is OFF (0) while the other two phases are ON (1), the neutral point voltage VN has become VB for one of them, then it is possible to determine that the phase for which this output voltage vector is OFF is the phase that has become missing. In other words, it is possible to decide that the W phase is the one that has become missing if VN=VB for the vector V2; it is possible to decide that the U phase is the one that has become missing if VN=VB for the vector V4; and it is possible to decide that the V phase is the one that has become missing if VN=VB for the vector V6.

It should be understood that, whichever phase is the one that has become missing, the value of the neutral point voltage VN for the vector V0 becomes 0 which is the same as the proper neutral point voltage VNR, and moreover the value of the neutral point voltage VN for the vector V7 becomes VB which is the same as the proper neutral point voltage VNR. Accordingly, by detecting the neutral point voltages for the vector V0 and for the vector V7, it is possible to tell apart the case of ground fault where the neutral point voltage VN for the vector V7 becomes lower than VB and the case of power line fault where neutral point voltage VN for the vector V0 becomes higher than zero, from the cases of phase missing. It should be understood that the ground fault means a fault that any phase is short-circuited to ground level, and the power line fault means a fault that any phase is short-circuited to the battery voltage level VB.

In this embodiment, an anomaly upon the output line for any one of the three phases can be detected by the motor current calculator 230 by the use of a method such as described above.

Figure 5:
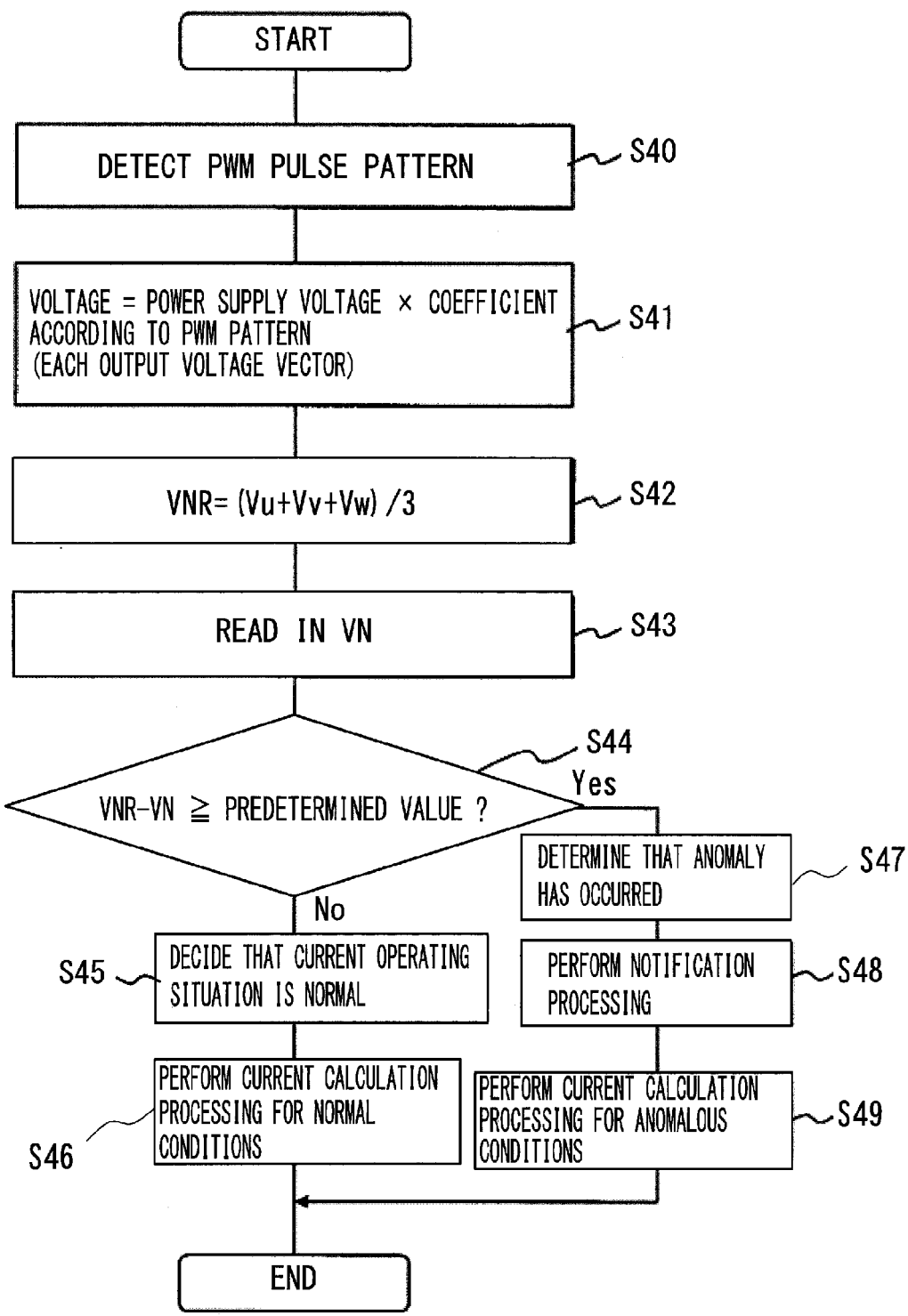
FIG. 5 is a flow chart showing a control flow for anomaly determination.

FIG. 5 is a figure showing the control flow for anomaly determination performed by the motor current calculator 230. This control flow of FIG. 5 will now be explained in the following. It should be understood that the control flow of FIG. 5 is executed by the motor current calculator 230, which is composed of a computer such as a microcomputer or the like. The motor current calculator 230 performs calculations such as described below and executes anomaly determination by a program implementing this control flow being repeatedly started at a predetermined time interval.

After the control flow of FIG. 5 starts, in step S40 the motor current calculator 230 detects the pulse pattern of the current PWM signals. As previously described, the pulse pattern of the PWM signals changes in synchronism with the PWM carrier Carry. Due to this, it is possible to detect the pulse pattern of the PWM signals by detecting the PWM signals for each phase outputted from the PWM generator 220 at timings synchronized with the PWM carrier Carry. And, due to this, it is possible to select what value for the proper neutral point voltage VNR should be adopted as a threshold value.

When the pulse pattern of the PWM signals has been detected in step S40, in the next step S41 the motor current calculator 230 calculates the voltages for the respective phases in order to obtain the proper neutral point voltage VNR corresponding to the pulse pattern that has been detected. Here, as described below, the voltages Vu, Vv, and Vw for the respective phases are calculated by multiplying the power supply voltage VB by voltage coefficients for the respective phases based upon the pulse pattern of the PWM signals that has been detected.

In concrete terms, if the pulse pattern of the PWM signals that has been detected is the vector V7, then the voltage coefficients for all of the three phases are ⅓. Moreover, if the pulse pattern of the PWM signals that has been detected is the vector V2, the vector V4, or the vector V6, then the voltage coefficients for two of the phases are ⅓, while the voltage coefficient for the remaining phase is 0. And, if the pulse pattern of the PWM signals that has been detected is the vector V1, the vector V3, or the vector V5, then the voltage coefficient for one of the phases is ⅓, while the voltage coefficients for the remaining two phases are 0. Furthermore, if the pulse pattern of the PWM signals that has been detected is the vector V0, then the voltage coefficients for all of the three phases are 0.

After having obtained the voltages for the respective phases corresponding to the PWM pulse pattern in step S41, next in step S42 the motor current calculator 230 calculates the value of the proper neutral point voltage VNR. Here, the value of the proper neutral point voltage VNR is calculated by adding together the voltages for the phases obtained in step S41. In other words, the value of the proper neutral point voltage VNR may be obtained on the basis of the voltages Vu, Vv, and Vw for the respective phases obtained in step S41 with their voltage coefficients taken into account, according to the following equation:

$$VNR=(Vu+Vv+Vw)/3$$

As shown at (d) in FIG. 3, the value of the proper neutral point voltage VNR given by the above equation is 0 volts for the vector V0, is ⅔×VB volts for the vectors V2, V4, and V6, is ⅓×VB volts for the vectors V1, V3, and V5, and is VB volts for the vector V7. The proper neutral point voltage VNR that has been obtained in this manner is used in the following calculation as a threshold value that corresponds to the PWM pattern.

Next in step S43 the motor current calculator 230 reads in and stores the value of the neutral point voltage VN from the neutral point voltage detection circuit 120. Here, the value detected by the neutral point voltage detection circuit 120 is acquired as the value of the neutral point voltage VN corresponding to the PWM pulse pattern that was detected in step S40.

Then in step S44 the motor current calculator 230 performs anomaly determination for the output lines on the basis of the proper neutral point voltage VNR that was obtained in step S42 and the neutral point voltage VN that was acquired in step S43. Here, the value of the neutral point voltage VN and the value of the proper neutral point voltage VNR are compared together, and, on the basis of the result of this comparison, a determination is made as to whether or not one of the phases has become missing. In concrete terms, by subtracting the neutral point voltage VN from the proper neutral point voltage VNR, the difference between them is calculated, and, if this difference is smaller than a predetermined value, then it is decided that the situation is normal, in other words that no phase is missing. In other words, if the difference is smaller than the predetermined value, then the proper neutral point voltage VNR and the actual neutral point voltage VN are substantially equivalent to each other, and accordingly it is decided that normal operation is being performed. On the other hand, if the difference that has been calculated is greater than the predetermined value, then it is decided that an anomaly is occurring, in other words that one of the phases has become missing. To express this differently, if the difference is greater than the predetermined value, then the actual neutral point voltage VN is fluctuating with respect to the proper neutral point voltage VNR, so that it is decided that anomalous operation is being performed. It should be understood that, if the calculation of the difference obtains the signed difference, i.e. the difference with a "+" or a "−" sign appended, then it is also possible to distinguish between phase missing and a ground fault or a power line fault, according to the PWM pulse pattern at this time.

If the difference between the proper neutral point voltage VNR and the neutral point voltage VN calculated in step S44 is less than the predetermined value, then the flow of control proceeds to step S45, in which the motor current calculator 230 determines that normal operation is being performed in which no phase is missing upon any of the output lines. Then in step S46 the motor current calculator 230 performs current calculation processing for normal conditions, and finally the processing shown in the FIG. 5 flow chart terminates.

On the other hand, if the difference between the proper neutral point voltage VNR and the neutral point voltage VN calculated in step S44 is greater than or equal to the predetermined value, then the flow of control proceeds to step S47, in which the motor current calculator 230 determines that an anomaly has occurred in which one of the phases upon one of the output lines has become missing. Then the flow of control proceeds to step S48, in which the motor current calculator 230 performs notification processing for issuing an alarm to the operator that one phase has become missing. This notification may be performed by warning to the driver of the vehicle that one of the three phases has become missing via some method such as, for example, illuminating a warning light (not shown in the figures) that is provided upon an instrument panel of the vehicle, or the like.

After performing the notification processing in step S48, in the next step S49, the motor current calculator 230 performs current calculation processing for anomalous conditions. In this current calculation processing for anomalous conditions, the motor current calculator 230 determines which is the output line of the phase that has become missing and sets the current value for this phase to zero, while calculating current values for the other two phases on the basis of the DC current Idc that is inputted from the current detector Rsh. When this current calculation processing for anomalous conditions has been completed, the motor current calculator 230 terminates the processing of the flow chart of FIG. 5.

It should be understood that while, in the embodiment described above, an example has been explained in which the decision as to which output line is the one for which the phase is missing is performed by obtaining the value of the proper neutral point voltage VNR by calculation in step S42, and by comparing the value of the neutral point voltage VN with this value of the proper neutral point voltage VNR, it would also be acceptable to make the decision as to which output line is the one for which the phase is missing by some other method. For example, it would also be possible to compare the neutral point voltage VN with a plurality of threshold values that are set in advance, and to make the decision as to which output line is the one for which the phase is missing on the basis of the results of these comparisons. In concrete terms, as shown at (d) in FIG. 3, three threshold values Vt1, Vt2, and Vt3 may be set in advance as a first anomaly determination level, a second anomaly determination level, and a third anomaly determination level respectively, and a relationship between these and the output voltage vectors may be stored in advance in a fixed memory or the like. And the decision as to which output line is the one for which the phase is missing is performed by selecting one of these anomaly determination levels according to the pulse pattern of the PWM signals that is detected, and comparing that anomaly determination level with the neutral point voltage VN that has been detected. If the phase on one of the output lines has become missing, it is possible to determine which of the phases is the one that has become missing on the basis of the neutral point voltage VN in this manner as well.

It would also be acceptable to execute a decision method of the type described above in a similar manner to the method shown in FIG. 4. In other words, it would be possible to perform the determination as to which output line is the one whose phase has become missing by replacing the value of the proper neutral point voltage VNR calculated in step S42 of FIG. 5 with one of the anomaly determination levels V1, V2, or V3, and performing as explained in the flow chart of FIG. 5.

It should be understood that, in the control flow shown in FIG. 5, during detection of the pulse pattern of the PWM signals in step S40, it is desirable to perform detection in the later half cycle of the PWM carrier, as will be described later. If this is done, then it is possible to decrease the load of processing upon the microcomputer. Furthermore, as shown at S1, S2, S3, S4 . . . of (d) in FIG. 3, it would be acceptable to arrange to detect the neutral point voltage VN and to perform anomaly determination each half cycle of the PWM carrier, at the timings of the vector V0 and the vector V7. Moreover, it would also be acceptable to perform anomaly determination on a cycle whose period is a positive integer multiple of half the period of the PWM carrier.

Next, the current calculation processing for anomalous conditions that is performed in step S49 of FIG. 5 will be explained with reference to FIGS. 6 through 9.

Figure 6:
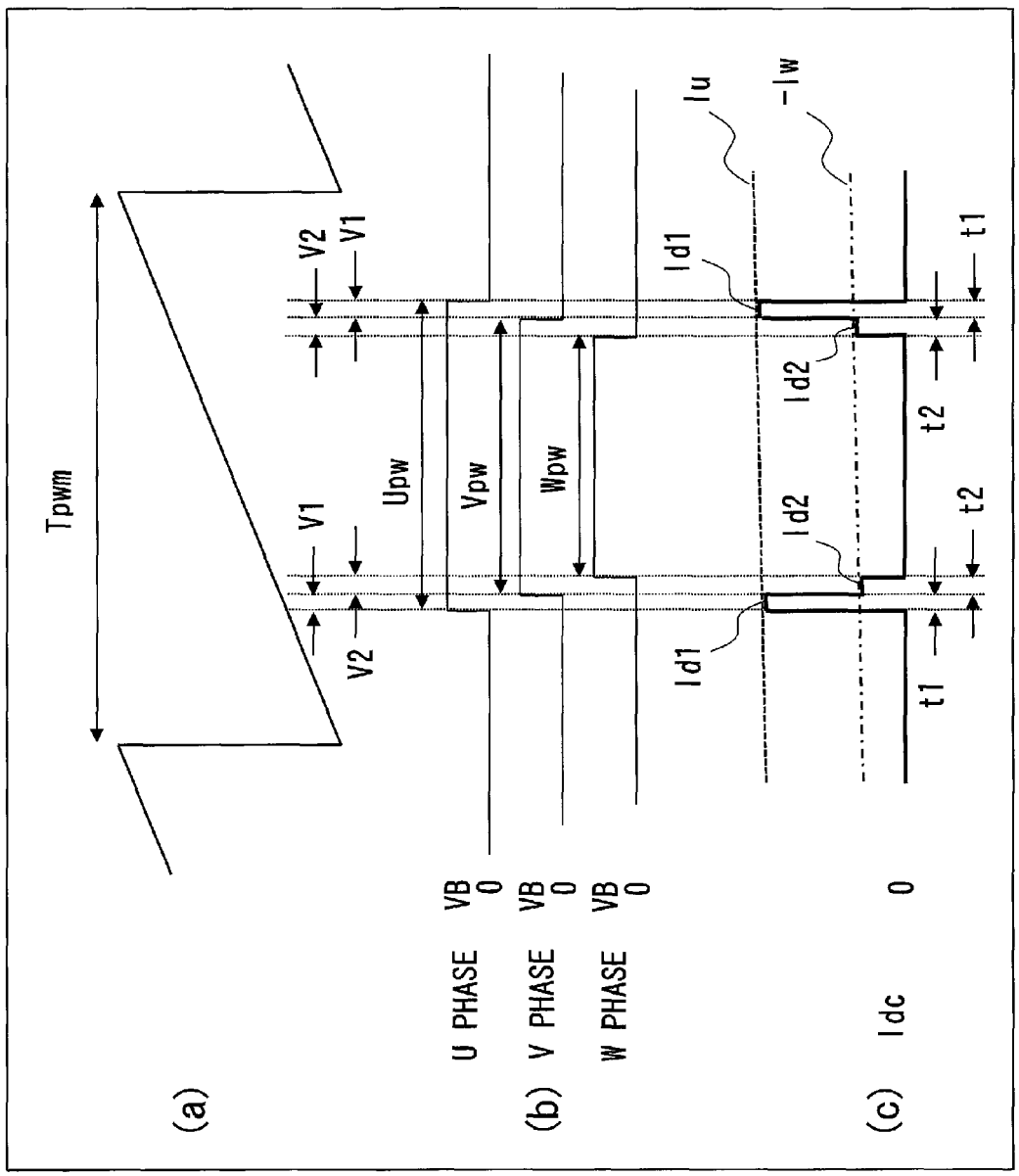
FIG. 6 is a figure showing an example of the waveform of a pulse form DC current flowing to the inverter circuit, when pulse shifting is not being performed.

FIG. 6 is a figure showing an example of the pulse form DC current waveform flowing through the inverter circuit 110. Here, a typical DC current waveform when no pulse shifting is being performed is shown, as will be explained later.

The diagram (a) in FIG. 6 shows a saw-tooth shaped timer count value for generating PWM pulses in the PWM generator 220. The period Tpwm of this saw-tooth wave is equal to the period of the PWM carrier Carry shown at (a) in FIG. 3.

And the diagram (b) in FIG. 6 shows the pulse form PWM signals for each phase that are outputted from the PWM generator 220 to the inverter circuit 110. At (b) in FIG. 6, single sections of the PWM pulses corresponding to instantaneous voltage commands are shown, and the PWM pulse widths for the three phases are shown as Upw, Vpw, and Wpw respectively.

Moreover, (c) in FIG. 6 shows the waveform of the DC current Idc detected by the current detector Rsh. As shown at (c) in FIG. 6, the DC current Idc changes from Id1 to Id2, or from Id2 to Id1, according to the PWM signals for the various phases shown at (b) in FIG. 6.

Here, the case is considered in which the width of the inter-phase pulse between the U phase and the V phase corresponding to the vector V1, and the width of the inter-phase pulse between the V phase and the W phase corresponding to the vector V2, are shorter than the minimum sampling time period of the A/D converter in the motor current calculator 230. In this case it is not possible to acquire the correct DC current value, since it is not possible for the motor current calculator 230 to sample the value of the DC current Idc. In other words, although a motor current flows due to a voltage between lines corresponding to the difference between the signals for the PWM pulses for the phases shown at (b) in FIG. 6 being provided to the electric motor 300, when this motor current is very small, in some cases the pulse widths t1 and t2 of the DC current Idc that are determined according to the widths of the inter-phase pulses respectively corresponding to the vector V1 and to the vector V2 described above do not reach the minimum pulse width TPS. In such cases it is not possible to detect the DC current Idc, so that it is not possible to control the motor current in an appropriate manner.

Figure 7:
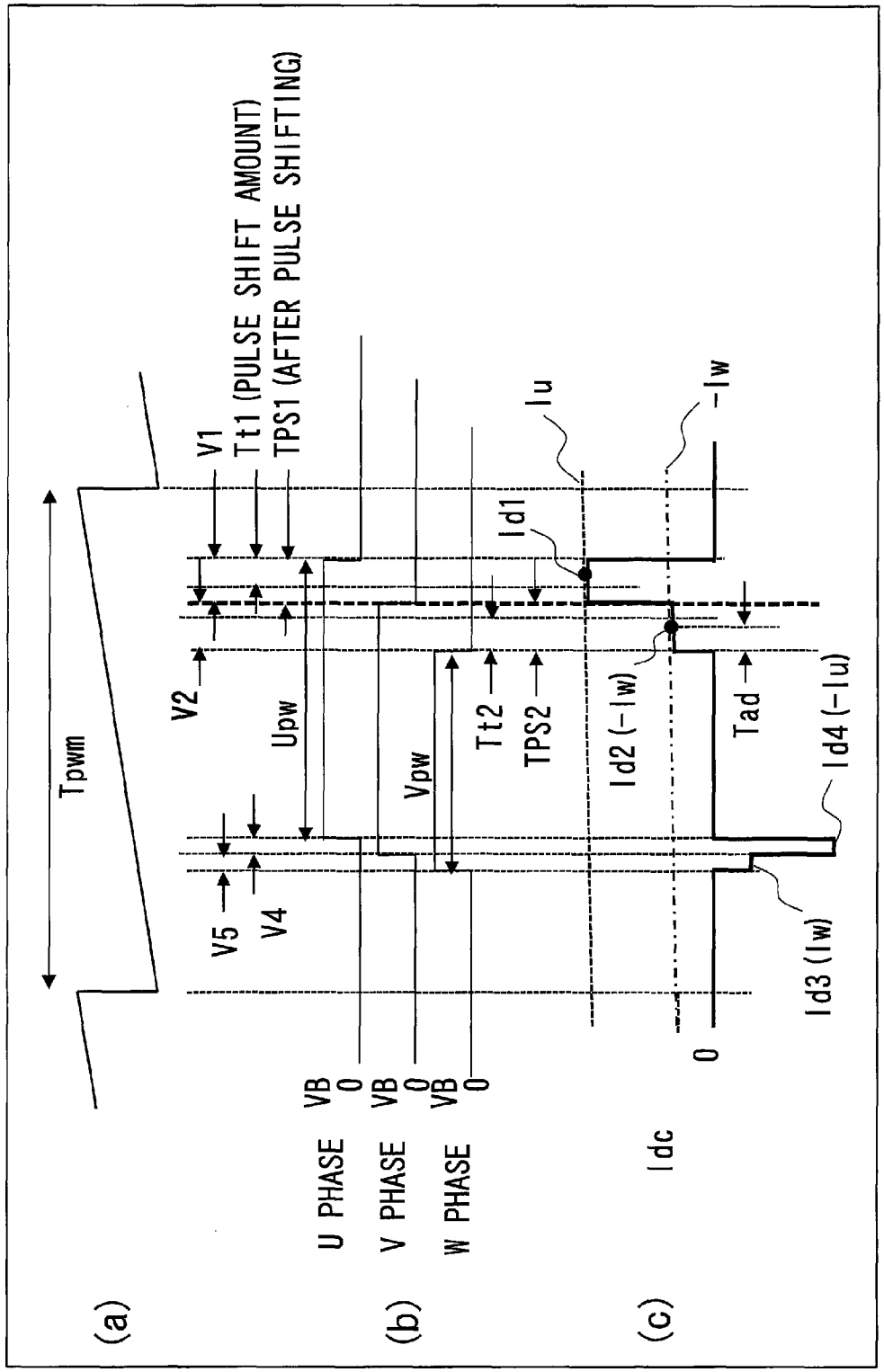
FIG. 7 is a figure showing an example of the waveform of the pulse form DC current flowing to the inverter circuit, when pulse shifting is being performed.

Next, with reference to FIG. 7, a case will be explained in which, in order to cope with a problem such as described above, pulse shifting is performed by changing the positions of the PWM signals. FIG. 7 is a figure showing an example of the waveform of the pulse form current that flows through the inverter circuit 110 when pulse shifting is being performed.

The ways in which FIG. 7 differs from FIG. 6 are that the positions of the pulses (i.e. the phases) shown at (b) of the U phase and the W phase among the PWM signals for the respective phases are shifted, and that the waveform of the DC current Idc shown at (c) is changed as a result. By doing this, the pulse width of the DC current Idc is made to be the minimum pulse width TPS, so that it becomes possible to detect the DC current Idc.

The pulse widths (Upw, Vpw, and Wpw) of the PWM signals for the respective phases shown at (b) of FIG. 7 are the same as those shown at (b) of FIG. 6. In FIG. 7(b), at the falling edges of the PWM pulses, taking the V phase pulse as a reference, the U phase pulse phase is delayed by just a pulse shift amount Tt2, and therefore the inter-phase pulse width of the U phase and the V phase that corresponds to the vector V1 is widened so as to become greater than or equal to the minimum pulse width TPS. Moreover, the inter-phase pulse of the U phase and the V phase that corresponds to the vector V4 is generated at the rising edges of the PWM pulses. Due to this, with respect to the inter-phase pulse of the U phase and the V phase corresponding to the vector V1 when pulse shifting is not performed which is shown at (b) in FIG. 6, a pulse is generated in the DC current Idc whose polarity is inverted and whose width is small. Due to this it is possible, while ensuring a sufficiently long sampling time period, to make the average value of the voltage applied to the electric motor 300 within a single section of the PWM pulses be equal to its value in the case shown at (b) in FIG. 6 in which pulse shifting is not performed. As a result, it is possible to adjust the phase and the voltage applied to the electric motor 30, and to control the electric motor 300.

At this time, in the waveform of the DC current Idc shown at (c) in FIG. 7, the width (i.e. the area) of the current pulse at the rising edges of the PWM pulses becomes smaller. It should be understood that an area of negative size appears at (c) in FIG. 7. On the other hand, at the falling edges of the PWM pulses, the width (i.e. the area) of the current pulse becomes greater. The total area of the current pulse for a single section of the PWM pulses at (c) in FIG. 7 is equal to the corresponding area at (c) in FIG. 6.

It is possible to acquire the DC current values Id1 and Id2 in an accurate manner by performing pulse shifting as described above, and by sampling the DC current Idc with the A/D converter in the motor current calculator 230. It should also be understood that it would be acceptable not to detect the DC current values Id3 and Id4 in the earlier half cycle of the PWM carrier. With the present invention, it is desirable to perform the detection of the neutral point voltage VN and the detection of the DC current values Id1 and Id2 at approximately the same timing.

Figure 8:
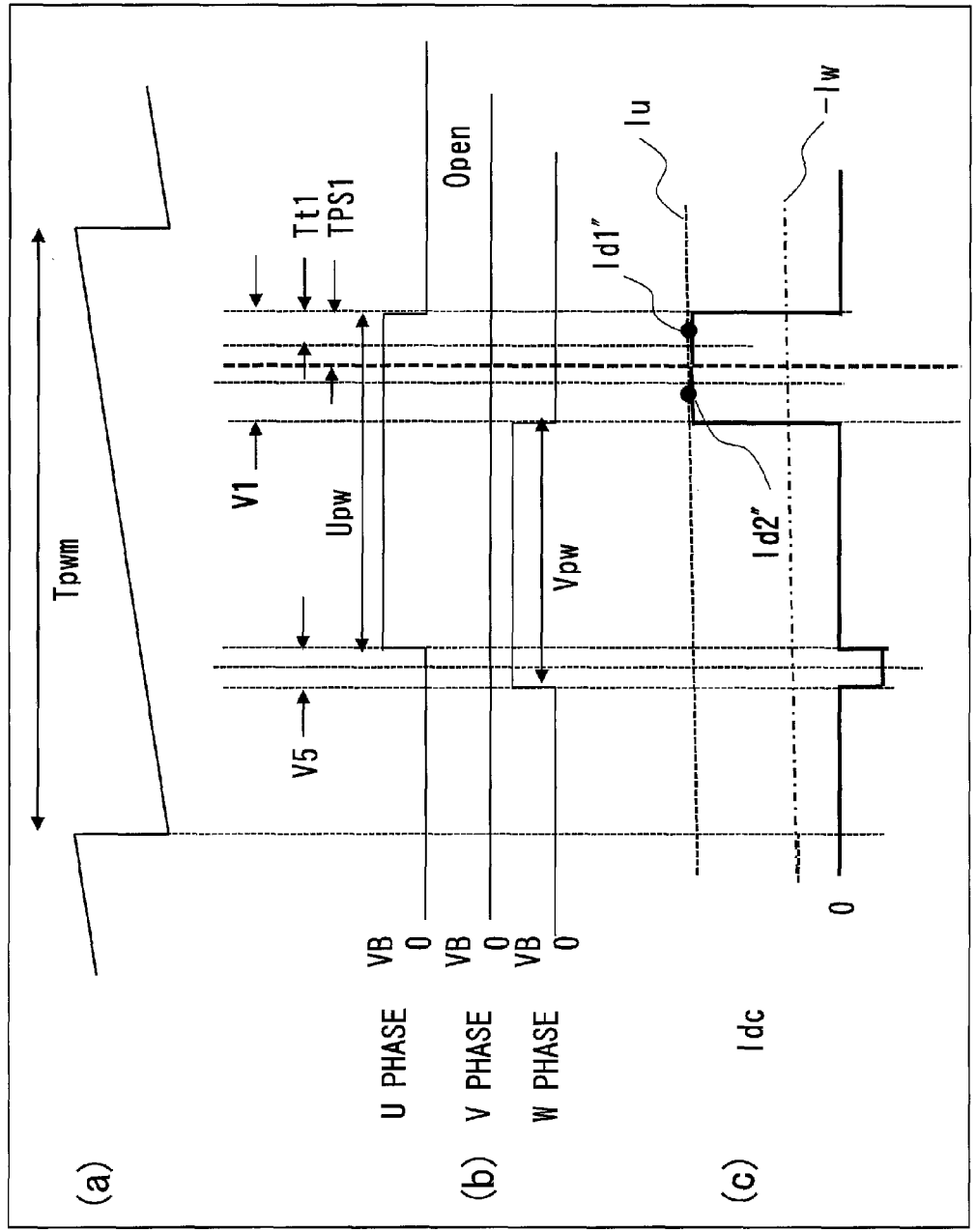
FIG. 8 is a figure showing an example of the waveform of the pulse form DC current flowing to the inverter circuit, when, in the state in which pulse shifting is being performed, the V phase has become missing.

Next, the operation for detection when the V phase is the one that has become missing will be explained with reference to FIG. 8. FIG. 8 is a figure showing an example of the waveform of the pulse form DC current flowing through the inverter circuit 110 when, in the state in which pulse shifting is being performed, the V phase has become missing.

The differences in FIG. 8 from FIG. 7 are that, among the PWM signals for the respective phases shown at (b), the PWM signal for the V phase has disappeared due to this V phase having become missing, and that the waveform of the DC current Idc shown at (c) is changed as a result.

In the FIG. 8 case, due to the fact that the V phase has become missing, the vector V1 is continuously outputted from the inverter circuit 110 in the interval from the fall of the PWM pulse of the W phase to the fall of the PWM pulse for the U phase. Due to this, the current value Iu of the U phase comes to be measured twice by the motor current calculator 230 as values Id1″ and Id2″ of the DC current Idc. However since, as shown at (c) in FIG. 7, the motor current calculator 230 calculates the current values for the respective phases under the supposition that the PWM pulse of the V phase is being outputted in a normal manner, accordingly it becomes impossible to calculate correct current values as it is. Thus it becomes necessary to perform calculation of corrected currents while taking account of the V phase having become missing and the current path changing, and to calculate current values for each of the phases correctly by doing this.

Next, this calculation of corrected currents that is performed by the motor current calculator 230 when a phase has become missing will be explained with reference to FIG. 9. FIG. 9 is a list table showing the relationship between the output voltage vectors and the DC current Idc, both during normal conditions and when one of the phases has become missing.

In this embodiment, the motor current calculator 230 is able to obtain the current value for each phase with respect to the DC current Idc during normal conditions, from the output voltage vectors from the inverter circuit 110 that are determined according to the PWM signals on the basis of the list table shown in FIG. 9. For example, during normal conditions when no phase is missing, the motor current value Iw for the W phase is obtained by using the DC current value Id2 during the vector V2 shown in FIG. 7. Moreover, the motor current value Iu for the U phase is obtained by using the DC current value Id1 during the vector V1. And the motor current for the remaining phase, i.e. for the V phase, may be obtained by using Equation (2) below:

$$0=Iu+Iv+Iw \quad (2)$$

On the other hand, as shown in FIG. 8, during an anomaly in which for example the V phase has become missing, in the interval in which the vector V2 should be outputted in case of normal conditions, actually the vector V1 is outputted. The value of the neutral point voltage VN that is detected in such a case is VN=VB/2. Moreover, during the interval in which the vector V1 is outputted in the same way as during normal conditions, the value of the neutral point voltage VN that is detected is also VN=VB/2. In this case, it is possible to determine that the V phase is the one that has become missing from the relationship between the output voltage vectors and the neutral point voltage VN shown in FIG. 4 at the time that the phase becomes missing.

When it has been possible, as described above, to determine that the V phase is the one that has become missing, then it is possible to obtain motor currents (Iu, Iv, Iw) for each of the phases with respect to the value of the DC current Idc from the relationship shown in FIG. 9 between the output voltage vectors and the DC current Idc in case of phase missing, and by putting Iv=0. By doing this, the motor current calculator 230 performs calculation of corrected currents when the V phase has become missing. In other words, even during an anomalous situation in which one of the phases has become missing, it is still possible to calculate corrected current values for the respective phases by determining which phase is the one that has become missing, and by using the value of the DC current Idc that is detected. As a result, it becomes possible to continue driving the electric motor 300.

Here, if the value of the DC current Idc that has been detected has not changed even though the PWM signals have changed, then, from the output voltage vector corresponding to these PWM signals, it is also possible to make a decision as to which of the phases is the one that has become missing. For example, it will be understood from FIG. 9 that Iv=0 is the condition that the detected value of the DC current Idc when the PWM signal for the vector V2 is outputted and the detected value of the DC current Idc when the PWM signal for the vector V1 is outputted should become equal. By doing this, it is possible to determine that the V phase is the one that has become missing. In other words, the motor current calculator 230 is able to determine which is the phase that has become missing on the basis of the DC current Idc corresponding to the change of PWM signals. Moreover, it would also be possible to perform both the determination of the phase that has become missing based upon the DC current Idc as described above and also the determination of the phase that has become missing based upon the neutral point voltage VN corresponding to the output voltages of the inverter circuit 110 as described above, together in parallel.

Next, the operation for output line anomaly detection in this first embodiment will be further explained with reference to the waveform diagram shown in FIG. 10. In the waveform diagram of FIG. 10, the difference from the diagram of FIG. 3 is that, with the three-phase voltage command values shown at (a), the modulated waves (i.e. the voltage command values) Vu*, Vv*, and Vw* of the inverter circuit 110 for the three phases are two phase modulated waveforms (with modulation ratio of 1.15). Since, due to this, it is possible to reduce the number of times that each of the switching elements in the inverter circuit 110 is switched, accordingly a great increase of the efficiency can be expected. Moreover, the zero phase voltage shown at (b) is different from that in the FIG. 3 case and has become a waveform that reaches Vmax at intervals of 60°, and this zero phase voltage is superimposed upon the neutral point voltage waveform shown at (d).

The motor current calculator 230 is able to perform output line anomaly detection operation according to a method similar to that explained in connection with FIGS. 3 through 9 with a two phase modulated wave such as that shown in FIG. 10 as well.

Figure 10:
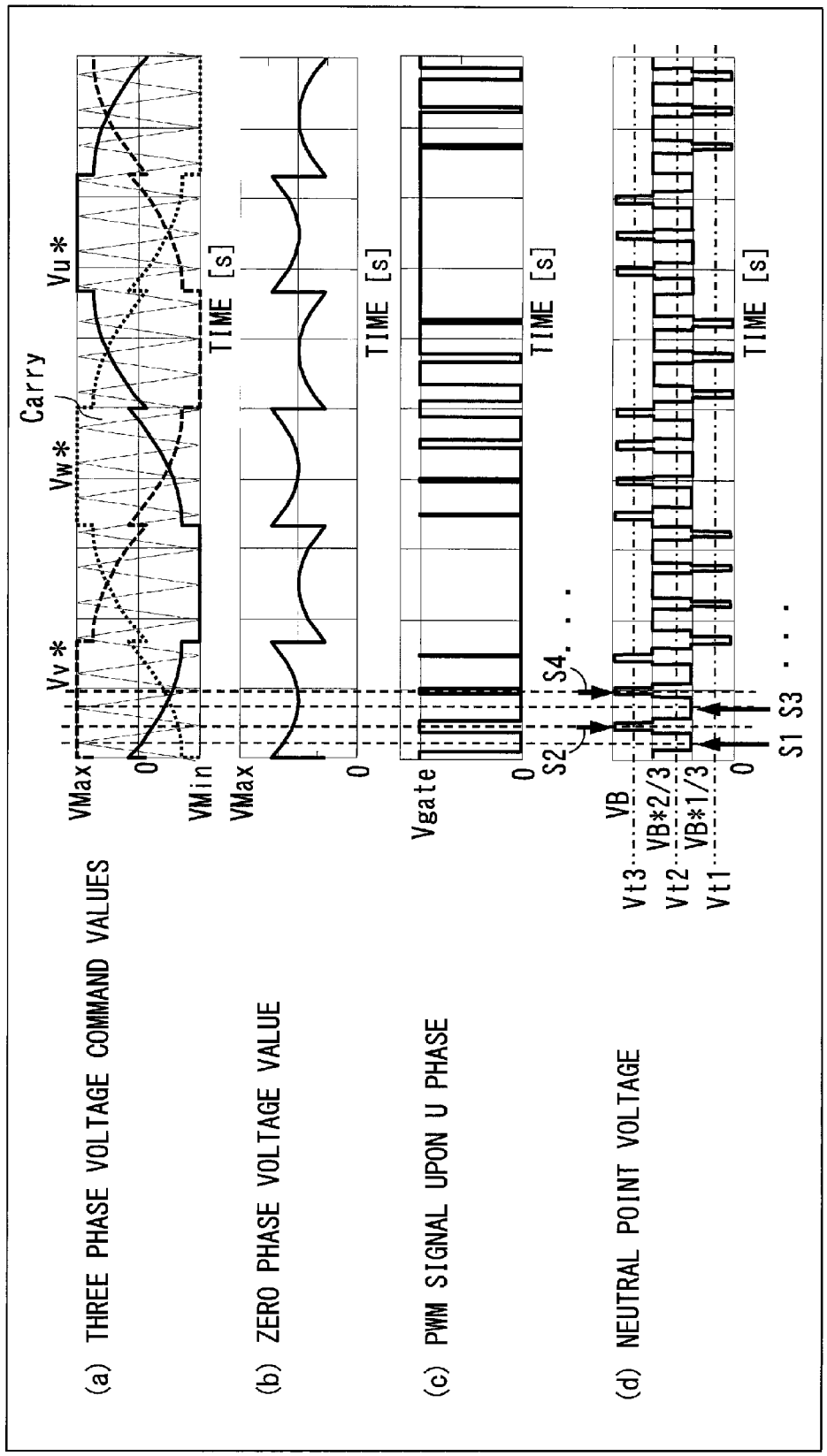
FIG. 10 is a waveform diagram for further explanation of the output line anomaly detection operation in the first embodiment.

As will be understood from FIG. 10, with the two phase modulated signal, voltage fluctuations synchronized to the output frequency from the inverter circuit 11 are superimposed upon the neutral point voltage VN of the electric motor 300. In this case as well, as shown at (d), it is possible to detect anomaly upon the output lines for the various phases by comparing together the neutral point voltage VN of the electric motor 300 and the proper neutral point voltage VNR for the vector V0 through the vector V7 in order.

It should be understood that, as previously described, it would also be acceptable to perform anomaly determination for the output lines for the various phases by setting three threshold values Vt1, Vt2, and Vt3 in advance as a first anomaly determination level, a second anomaly determination level, and a third anomaly determination level, by selecting one of these three anomaly determination levels according to the pulse pattern of the PWM signals, and by comparing the neutral point voltage VN that has been detected with this selected anomaly determination level. In this case, as shown at (d) in FIG. 10, it would be possible to select the anomaly determination level by taking advantage of the fact that an output of less than or equal to VB×⅓ at the timings shown by S1 and S3, and an output of greater than or equal to VB×⅔ at the timings shown by S2 and S4, are repeated at intervals of a predetermined number of times.

Moreover, the output line anomaly detection operation in this first embodiment will now be further explained with reference to the waveform diagram shown in FIG. 11. In the waveform diagram of FIG. 11, the difference from the diagram of FIG. 3 is that, with the three-phase voltage command values shown at (a), the modulated waves (i.e. the voltage command values) Vu*, Vv*, and Vw* of the inverter circuit 110 for the three phases are 180 degree square waves, with the modulation ratio being 1.27. Since, due to this, it is possible to reduce the number of times that each of the switching elements in the inverter circuit 110 is switched, accordingly a great increase of the efficiency can be expected. Moreover, the neutral point voltage waveform shown at (b) is a square wave having period of 60°. It should be understood that the waveform of the zero phase voltage like that of (b) of FIG. 3 and the waveform of the PWM signal inputted to the upper arm of the U phase like that of (c) of FIG. 3 are omitted from FIG. 11.

The motor current calculator 230 is able to perform output line anomaly detection operation according to a method similar to that explained in connection with FIGS. 3 through 9 with a 180° modulated square wave such as that shown in FIG. 11 as well.

Figure 11:
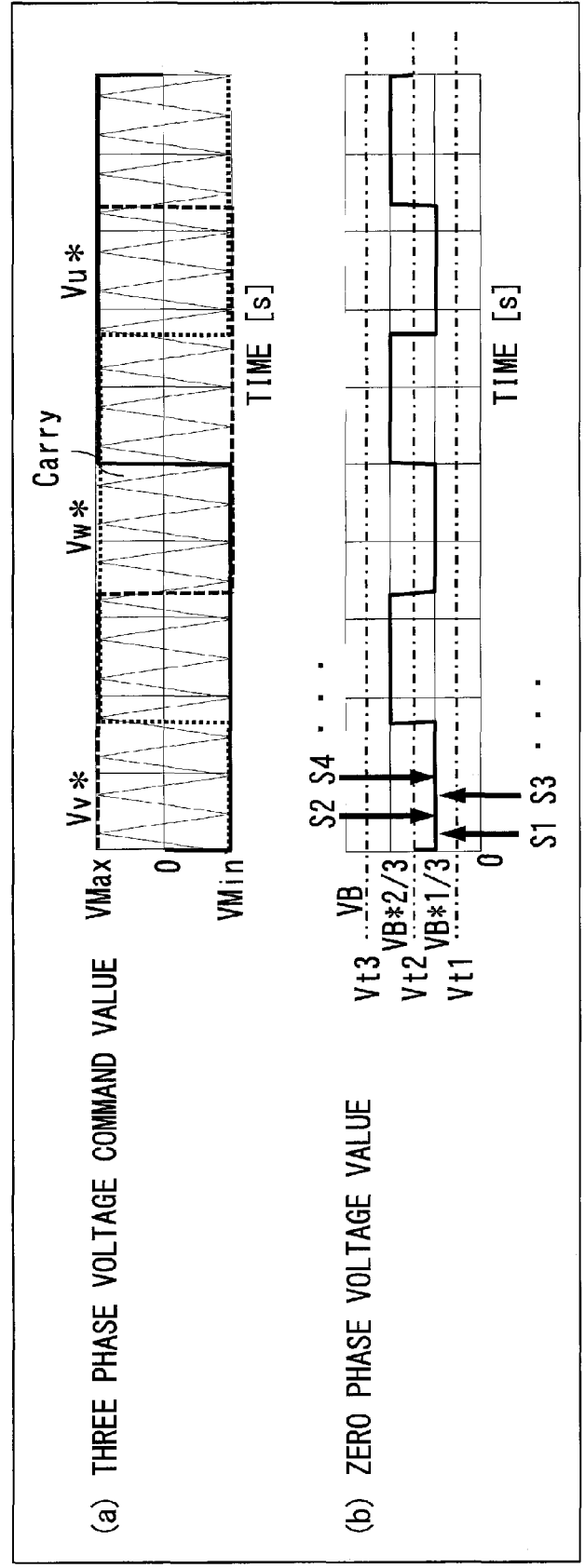
FIG. 11 is a waveform diagram for yet further explanation of the output line anomaly detection operation in the first embodiment.

As will be understood from FIG. 11, with the 180° square wave modulated signal, voltage fluctuations synchronized to the output frequency from the inverter circuit 11 are superimposed upon the neutral point voltage VN of the electric motor 300. In this case as well, as shown at (b), it is possible to detect anomaly upon the output lines for the various phases by comparing together the neutral point voltage VN of the electric motor 300 and the proper neutral point voltage VNR for the vector V0 through the vector V7 in order.

It should be understood that in this case as well, as previously described, it is possible to perform anomaly determination for the output lines for the various phases by comparing the neutral point voltage VN with an anomaly determination level. In this case, as shown at (b) in FIG. 11, an output of less than or equal to VB×⅓ at the timings shown by S1 and S3, and an output of greater than or equal to VB×⅔ at the timings shown by S2 and S4, do not appear. Accordingly it is desirable to perform the anomaly determination, not by using the threshold values Vt1 through Vt3 described above, but by only using the threshold value Vt2 as the second anomaly determination level.

As has been explained above, in this embodiment, it is possible to determine whether or not any phase has become missing by comparing together the value of the proper neutral point voltage VNR, which is determined by the PWM pulse pattern (i.e. by the output voltage vector) according to the modulated wave, and the value of the actual neutral point voltage VN, which is determined by the PWM pulse pattern. Due to this, it is possible to detect the presence of an anomaly with high reliability. Moreover, it is possible to perform anomaly detection in a stable manner, irrespective of the output frequency of the inverter.

According to the first embodiment of the present invention as explained above, the following operations and beneficial effects are obtained.

(1) The inverter device 100, which is an electric motor drive control device that controls the driving of the electric motor 300, comprises: the inverter circuit 110 that converts DC power inputted via DC bus bars to three-phase (i.e. multiphase) AC power and outputs this multiphase AC power to the electric motor 300; the current detector Rsh that detects the DC current flowing in the DC bus bars; the PWM generator 220 that generates PWM signals for controlling the inverter circuit 110, and outputs the PWM signals to the inverter circuit 110; the motor current calculator 230 that calculates the current values Iu, Iv, and Iw for each of the phases to be flowed to the electric motor 300 on the basis of the value of DC current Idc detected by the current detector Rsh and the PWM signals; and the current controller 210 that generates a command signal for controlling the PWM generator 220 on the basis of the current values Iu, Iv, and Iw for each of the phases calculated by the current calculator 230, and outputs the command signal to the PWM generator 220. And, if one of the phases of the AC power outputted from the inverter circuit 110 has become missing, in step S49 of FIG. 5, the current calculator 230 determines which phase is the one that has become missing, and calculates current values for the other phases. Since these arrangements are adopted, accordingly it is possible to continue driving the electric motor 300 which is driven by receiving three-phase (i.e. multiphase) AC power in a safe manner, even if one of the phases has become missing while the motor is being driven.

(2) The motor current calculator 230 determines which of the phases is the one that has become missing on the basis of at least one of the output voltages of the inverter circuit 110 for the various phases that change according to the PWM signals, and the DC current Idc that corresponds to the PWM signals. Since it is arranged to do this, accordingly it is possible to determine which of the phases is the one that has become missing in a reliable manner.

(3) The inverter device 100 includes the neutral point voltage detection circuit 120 that detects the neutral point voltage VN of the electric motor 300 on the basis of the output voltages of the three phases of the inverter circuit 110. And the motor current calculator 230 determines which phase is the one that has become missing on the basis of the neutral point voltage VN that has been detected by this neutral point voltage detection circuit 120. In concrete terms the proper neutral point voltage VNR, which is the theoretical value of the neutral point voltage VN of the electric motor 300, is obtained on the basis of the pulse pattern of the PWM signals, the neutral point voltage VN and this proper neutral point voltage VNR are compared together, and it is determined which phase is the one that has become missing on the basis of the result of this comparison. Or, alternatively, the neutral point voltage VN may be compared with a plurality of threshold values that are set in advance, and it may be determined which phase is the one that has become missing on the basis of the results of these comparisons. In other words, one of the first, the second, or the third threshold value is selected on the basis of the pulse pattern of the PWM signals, and the threshold value that has been selected is compared with the neutral point voltage VN. Since it is arranged to do this, accordingly it is possible to determine which of the phases is the one that has become missing in an accurate manner on the basis of the output voltages of the inverter circuit for the various phases, which change according to the PWM signals.

(4) If any of the phases of the AC power outputted from the inverter circuit 110 becomes missing, the inverter device 100 issues a warning in step S48 of FIG. 5. Since it is arranged to do this, accordingly it is possible to inform the driver of a vehicle, or some other person, of the fact that one of the phases has become missing.

Embodiment #2

Figure 12:
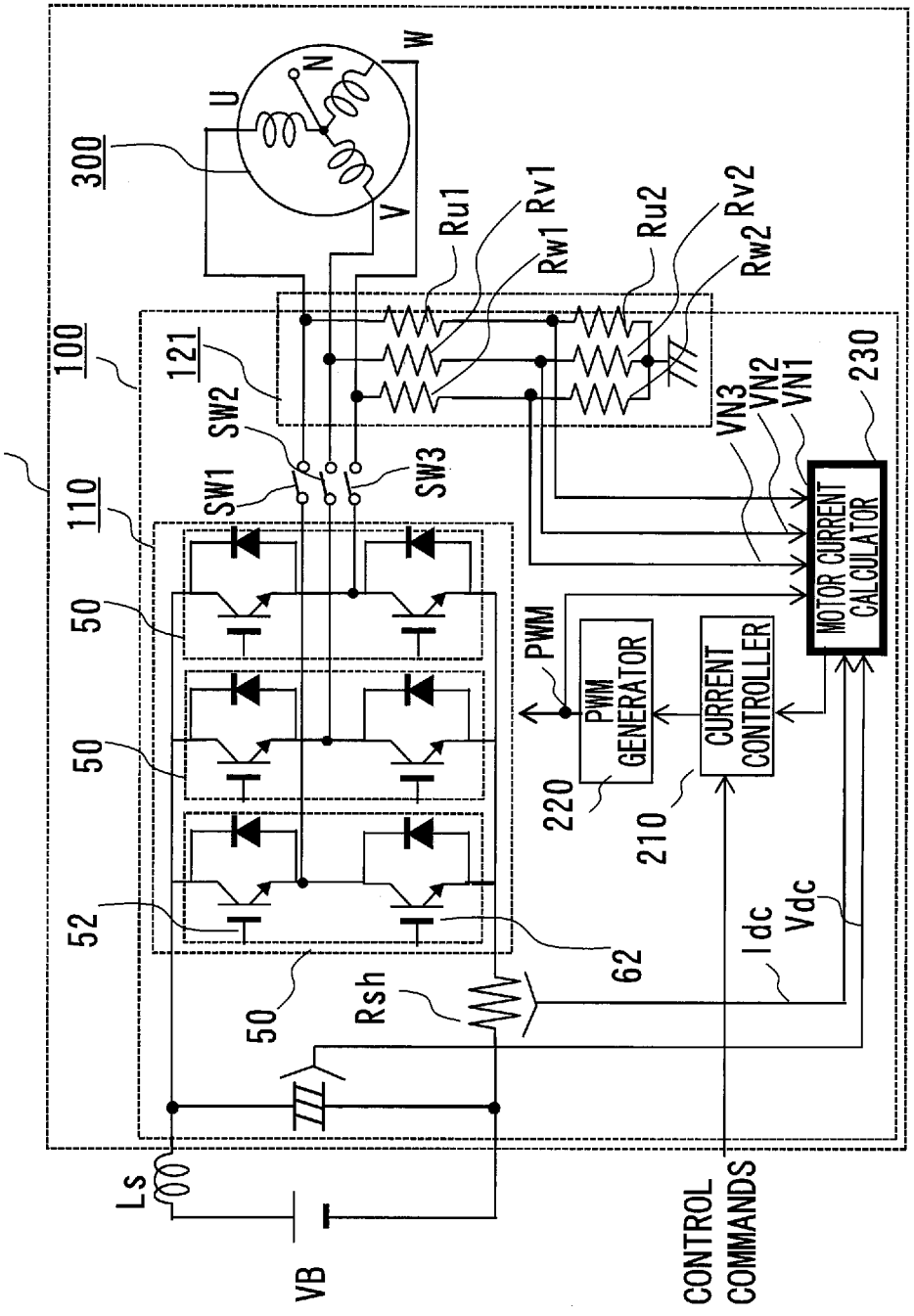
FIG. 12 is a figure showing the structure of an electric motor drive control device according to a second embodiment of the present invention.

Next, an electric motor drive control device according to a second embodiment of the present invention will be explained. FIG. 12 is a figure showing the structure of this electric motor drive control device according to the second embodiment of the present invention. The features in FIG. 12 that are different from the structure of the first embodiment shown in FIG. 1 are that a phase voltage detection circuit 121 is provided instead of the neutral point voltage detection circuit 120 of FIG. 1, and that respective cutoff switches SW1, SW2, and SW3 for each of the phases are provided on the output side of the inverter circuit 110.

In FIG. 12, the cutoff switches SW1, SW2, and SW3 are switches that, when one of the series circuits 50 provided to the respective phases of the inverter circuit 110 is faulty, intercept the corresponding output line corresponding to that phase. In other words if, in one of the series circuits 50 of the inverter circuit 110, its IGBT 52 or its IGBT 62 experiences a short circuit fault, then the corresponding one of the cutoff switches SW1, SW2, and SW3 goes to open. Due to this, the generation of braking current during rotation of the electric motor 300 is prevented.

The phase voltage detection circuit 121 detects the output voltages Vu, Vv, and Vw for each phase outputted from the inverter circuit 110, and outputs the signals VN1, VN2, and VN3 corresponding to the results of this detection to the motor current calculator 230. And, as shown in FIG. 12, the phase voltage detection circuit 121 comprises the resistors Ru1, Rv1, and Rw1 and the resistors Ru2, Rv2, and Rw2 that are respectively connected in series with them, each of these series combinations being connected between the output line for one of the three phases and ground. The motor current calculator 230 acquires the output signal VN1 corresponding to the value of the output voltage Vu of the U phase, the output signal VN2 corresponding to the value of the output voltage Vv of the V phase, and the output signal VN3 corresponding to the value of the output voltage Vw of the W phase by taking in the voltages at the intermediate points of each of these series combinations.

Figure 13:
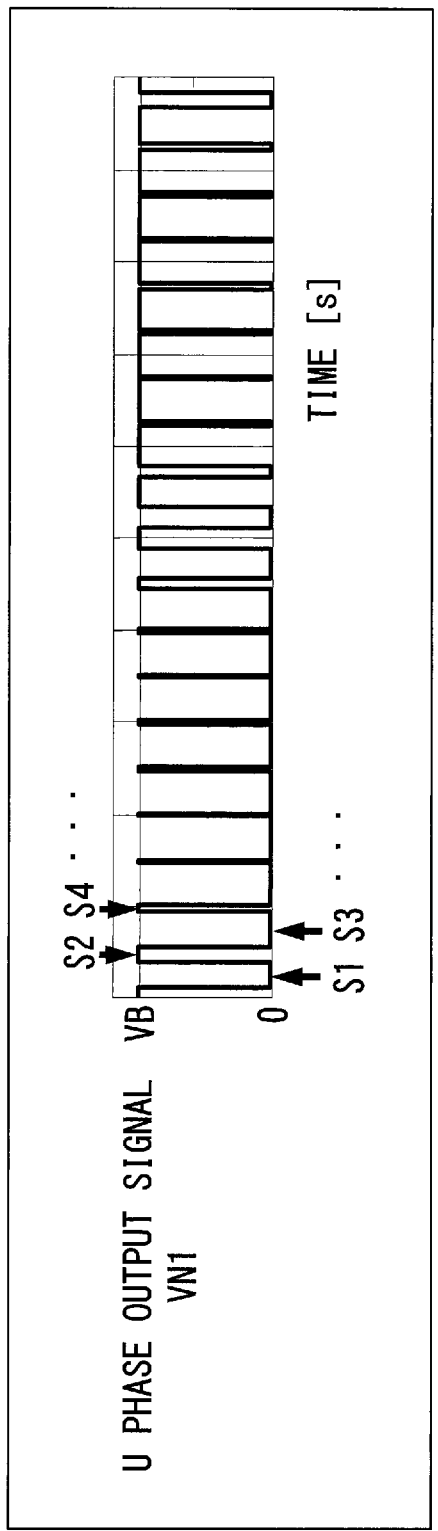
FIG. 13 is a figure showing an example of a U phase output signal outputted from a phase voltage detection circuit.

FIG. 13 shows an example of the output signal VN1 for the U phase outputted from the phase voltage detection circuit 121. While here only the output signal VN1 for the U phase is shown by way of example, it should be understood that the same considerations hold for the output signal VN2 for the V phase and for the output signal VN3 for the W phase.

In this embodiment, the motor current calculator 230 calculates and obtains the value of the neutral point voltage VN of the electric motor 300 on the basis of the output signals VN1, VN2, and VN3 from the phase voltage detection circuit 121, according to the following Equation (3):

$$VN=(VN1+VN2+VN3)/3 \quad (3)$$

In this embodiment, the value of the neutral point voltage VN is obtained by performing the calculation described above in step S43 of FIG. 5. And, as explained in connection with the first embodiment, in the next step S44, a decision is made as to whether or not one of the phases upon the output lines has become missing by comparing together the value of the neutral point voltage VN obtained in step S43 and the proper neutral point voltage VNR.

Moreover, as shown at S1, S2, S3, S4 . . . in FIG. 13, if the neutral point voltage VN is detected at the timings of the vector V0 and the vector V7, it becomes possible to perform sampling with the PWM pulse widths in a broad state, even if the output power of the inverter circuit 110 is large. Due to this, it is possible to perform detection of an anomalous state in a more accurate manner.

It should be understood that, if a fault occurs of the type in which one of the cutoff switches SW1, SW2, or SW3 comes to be always in the open state, then this can be detected as being a situation in which the corresponding phase has become missing.

In this manner, in this embodiment as well, it is possible to determine upon the presence or absence of a phase that has become missing by comparing together the proper neutral point voltage VNR which is determined by the PWM pulse pattern (i.e. by the output voltage vector) according to the modulated wave, and the value of the actual neutral point voltage VN which is determined by the PWM pulse pattern. Due to this, it is possible to perform anomaly detection at high reliability, in a similar manner to the case with the first embodiment. Moreover, it is possible to perform anomaly detection in a stable manner, irrespective of the output frequency of the inverter.

According to the second embodiment of the present invention as explained above, similar operations and beneficial effects are obtained to those of the first embodiment.

Embodiment #3

Figure 14:
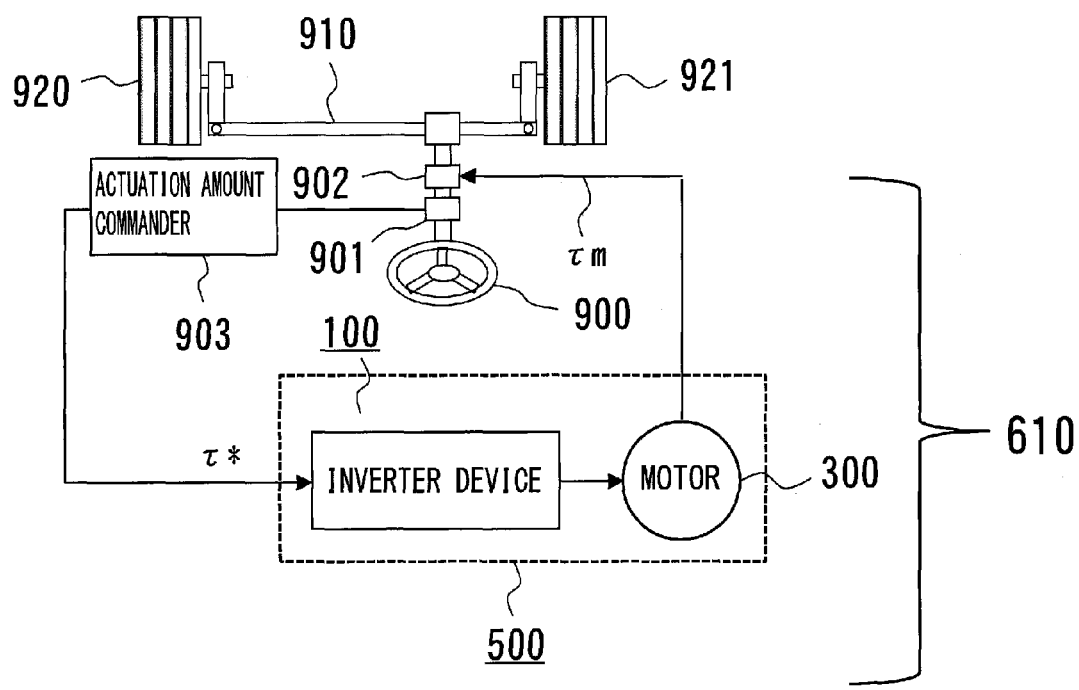
FIG. 14 is a figure showing the structure of a steering system that includes an electrically driven power steering device according to a third embodiment of the present invention.

Next, a third embodiment of the present invention will be explained. In this third embodiment, an electrically driven power steering device will be explained to which an electric motor drive control device as described with reference to the first or the second embodiment is applied. FIG. 14 is a figure showing the structure of a steering system that includes an electrically driven power steering device 500 according to this third embodiment of the present invention.

The steering system of FIG. 14 comprises an electrically driven actuator 610, a steering wheel 900, a steering detector 901, and an actuation amount commander 903. The force with which the driver actuates the steering wheel 900 for steering the vehicle is assisted by employing torque that is provided by the electrically driven actuator 610.

The electrically driven actuator 610 comprises a torque transmission mechanism 902 and an electrically driven power steering device 500 that is equipped with an electric motor 300 and an inverter device 100, as shown in FIGS. 1 and 12 in connection with the first and the second embodiment.

A torque command τ* for the electrically driven actuator 610 is a value that is generated by the actuation amount commander 903 as a steering assistance torque command for the steering wheel 900, and is generated for employing the electrically driven actuator 610 in order to reduce the steering force needed from the driver of the vehicle.

The inverter device 100 receives this torque command τ* as an input command, and controls the motor current flowing to the electric motor 300 so as to track the torque command value on the basis of the torque constant of the electric motor 300 and the torque command τ*.

Via the torque transmission mechanism 902 that employs a speed reduction mechanism such as a worm and wheel, a planetary gear, or the like, or a hydraulic mechanism, the electric motor output τm that is outputted from an output shaft directly coupled to the rotor of the electric motor 300 assists the steering force exerted upon the steering wheel 900 by the driver of the vehicle (i.e. his actuation force) with electrically provided force, and thereby actuates the steering angles of vehicle wheels 920 and 921, which are steered wheels.

This actuation amount is detected as the steering angle or the steering torque by the steering detector 901, which is installed to the steering shaft and detects the steering state, and the assistance amount is then determined by the actuation amount commander 903 as the torque command τ*, while taking into account various parameters such as the vehicle speed, the state of the road surface, and so on.

With this electrically driven power steering device 500 to which the present invention is applied, it is possible to detect anomaly of the electric motor 300 such as a phase becoming missing or the like, even while the electric motor 300 is being abruptly accelerated or decelerated, and accordingly the beneficial operational effect is obtained that it is possible to enhance the level of safety by continuing to drive the electric motor 300.

According to the third embodiment of the present invention as explained above, the electrically driven power steering device 500 comprises: the inverter device 100, which is an electric motor drive control device; the torque transmission mechanism 902 that transmits actuation of the steering wheel by the driver of the vehicle to the steered vehicle wheels 920 and 921; and the electric motor 300 that is driven under the control of the inverter device 100, and that generates rotational torque for assisting steering actuation. Since these arrangements are provided, accordingly it is possible to continue assistance of steering actuation by the driver with the electric motor 300 in a safe manner, even if one of the phases becomes missing while the electric motor 300 is being driven.

Embodiment #4

Figure 15:
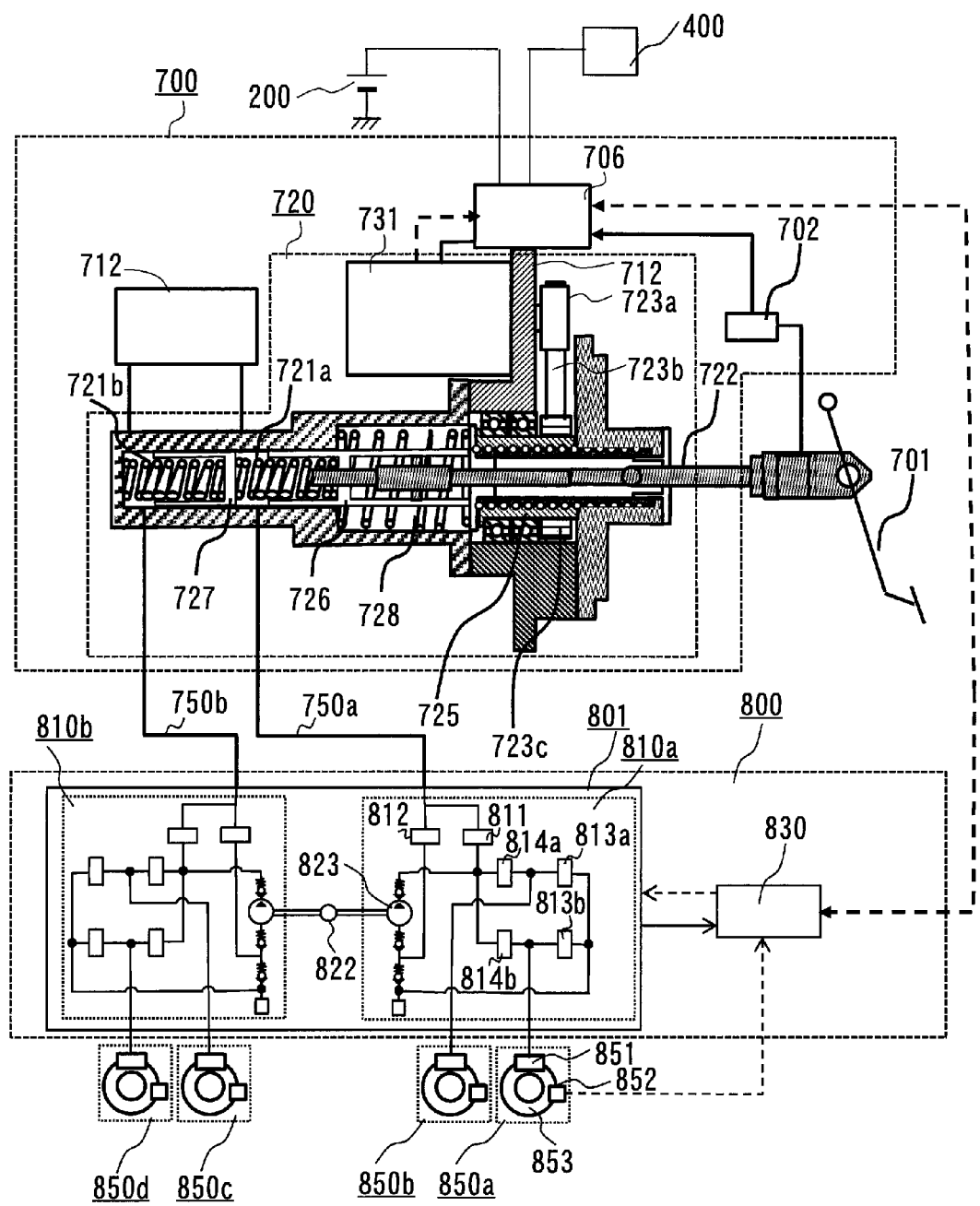
FIG. 15 is a figure showing the structure of an electrically driven brake device according to a fourth embodiment of the present invention.

Next, a fourth embodiment of the present invention will be explained. In this fourth embodiment, an electrically driven brake device will be explained to which an electric motor drive control device as described with reference to the first or the second embodiment is applied. FIG. 15 is a figure showing the structure of an electrically driven brake device according to this fourth embodiment of the present invention.

An assistance control unit 706 of FIG. 15 has a similar function to that of the inverter devices 100 shown in FIG. 1 and FIG. 12, and incorporates a microcomputer program for performing braking operation for a vehicle. Moreover, a motor 731 has a similar function to that of the electric motors 300 shown in FIG. 1 and FIG. 12, but differs from those motors by the feature that a braking assistance device 700 is integrally attached thereto. Furthermore, the motor 731 differs from the electric motor 300 in having a structure that is integrated with the assistance control unit 706 via a casing 712.

The electrically driven brake device of FIG. 15 comprises a brake pedal 701, the braking assistance device 700, a booster device 800, and wheel mechanisms 850a through 850d. The braking assistance device 700 comprises an assistance mechanism 720, a primary fluid chamber 721a, a secondary fluid chamber 721b, and a reservoir tank 714. The amount by which the driver of the vehicle steps upon the brake pedal 701 for actuation is inputted to the assistance mechanism 720 via an input rod 722, and is transmitted to the primary fluid chamber 721a.

Moreover the brake actuation amount, which is detected by the stroke sensor 702 fitted to the brake pedal 701, is inputted to an assistance control unit 706 that controls the assistance mechanism 720. The assistance control unit 706 controls the motor 731 so as to make it assume a rotational position that corresponding to the brake actuation amount that has thus been inputted. And, via speed reduction devices 723a, 723b, and 723c, the rotational torque of the motor 731 is transmitted to a rotation-translation conversion device 725 such as a ball screw or the like and is converted to translational power, and exerts pressure upon a primary piston 726. Due to this, along with the pressure of the working fluid in the primary fluid chamber 721a being increased, also a secondary piston 727 is pressurized so that the pressure of working fluid in the secondary fluid chamber 721b is increased.

The booster device 800 provides braking force for the vehicle by inputting working fluid that has been pressurized by the primary fluid chamber 721a and the secondary fluid chamber 721b via respective master conduits 750a and 750b, and transmitting fluid pressure to the wheel mechanisms 850a through 850d according to commands from a booster control unit 830.

The amount of displacement of the primary piston 726 is controlled by the assistance control unit 706 in order to adjust the amount of pressure provided by the primary piston 726. Since the amount of displacement of the primary piston 726 is not detected directly, the rotational angle of the motor 731 is calculated on the basis of a signal from a rotational position sensor (not shown in the figure) that is provided within the motor 731, and the amount of displacement of the primary piston 726 is obtained by calculation based upon the amount of propulsion provided by the rotation-translation conversion device 725.

It should be understood that, even if a situation develops in which the motor 731 stops due to a fault so that it can no longer control the shaft of the rotation-translation conversion device 725 to return back, it is still ensured that braking operation by the driver will not be hampered, because the shaft of the rotation-translation conversion device 725 is returned to its initial position by the reaction force of a return spring 728. For example, it is possible thereby to avoid a situation in which the behavior of the vehicle becomes unstable due to dragging of the brakes.

In the booster device 800, a booster mechanism 801 comprises pressure regulation mechanisms 810a and 810b of two independent braking systems each of which regulates the pressure of the working fluid of one diagonal pair of wheels among the four wheels, and is adapted to be capable of stopping the vehicle in a stable manner even if a fault should develop in one of those systems. In detail, the pressure regulation mechanism 810a is capable of adjusting the braking force of each of the two wheel mechanisms 850a and 850b of a pair of wheels that are mutually opposed on one vehicle diagonal, and the pressure regulation mechanism 810b is capable of adjusting the braking force of each of the other two wheel mechanisms 850c and 850d of the other pair of wheels that are mutually opposed on the other diagonal. Since the pressure regulation mechanisms 810a and 810b of the two systems both operate in a similar manner, only the operation of the pressure regulation mechanism 810a for one of the systems will be explained in the following. The pressure regulation mechanism 810a comprises: a pump 823 that raises the pressure of a master pressure that is generated by working fluid pressure from a master conduit 750a; a pump motor 822 that drives the pump 823; a gate OUT valve 811 that controls the supply of working fluid from the master conduit 750a to the wheel cylinders 851 of the wheel mechanisms 850a and 850b; a gate IN valve 812 that controls the supply of working fluid to the pump 823 from the master conduit 750a; IN valves 814a and 814b that control the supply of working fluid from the master conduit 750a or the pump 823 to the wheel cylinders 851; and OUT valves 813a and 813b that control reduction of the pressure in the wheel cylinders 851. For example, when performing pressure control for anti-locking brake control, signals from vehicle wheel rotation sensors 852 within the wheel mechanisms 850a and 850b are processed by the booster control unit 830, and, when vehicle wheel locking is detected during braking, action is performed to operate the IN/OUT valves (which are of an electromagnetic type) and the pump, thereby adjusting the pressure so that the vehicle wheels do not lock. It should be understood that this pressure regulation mechanism 810a is a mechanism that can also be applied when performing pressure control in order to control the behavior of the vehicle to be stable.

With this type of electrically driven brake device, along with the motor 731 being always used for stabilization assistance, the motor 731 is also used for control of the amount of displacement of the primary piston 726. Due to this, not only is the accuracy high, but also both continuation of stabilized operation and a capability of accurately detecting anomaly are obtained. Accordingly, by applying the present invention to such an electrically driven brake device, even if the phase upon one of the output lines that convey AC power to the motor 731 from the assistance control unit 706 should become missing, still it is possible to detect this fact in an appropriate manner, and to continue to provide braking assistance operation safely. Moreover this is a system that can continue braking assistance operation by using an auxiliary power supply 400 for supply of power if the charging capacity of the battery 200 that supplies power to the assistance control unit 706 undesirably decreases, although in this case the amount of braking assistance becomes reduced.

According to the fourth embodiment of the present invention as explained above, the electrically driven brake device comprises: the assistance control unit 706, which is an electric motor drive control device; the primary fluid chamber 721a, the secondary fluid chamber 721b, the master conduits 750a and 750b, and the pressure regulation mechanisms 810a and 810b, which serve as a transmission mechanism that transmits brake actuation by the driver of the vehicle to the wheel cylinders 851, which are braking mechanisms of the vehicle, via the working fluid; and the motor 731 that is driven under control of the assistance control unit 706 and that generates rotational torque for increasing the pressure of the working fluid according to brake actuation. Since these arrangements are provided, accordingly it is possible to continue assistance of brake actuation by the driver with the motor 731 in a safe manner, even if one of the phases becomes missing while the motor 731 is being driven.

Embodiment #5

Figure 16:
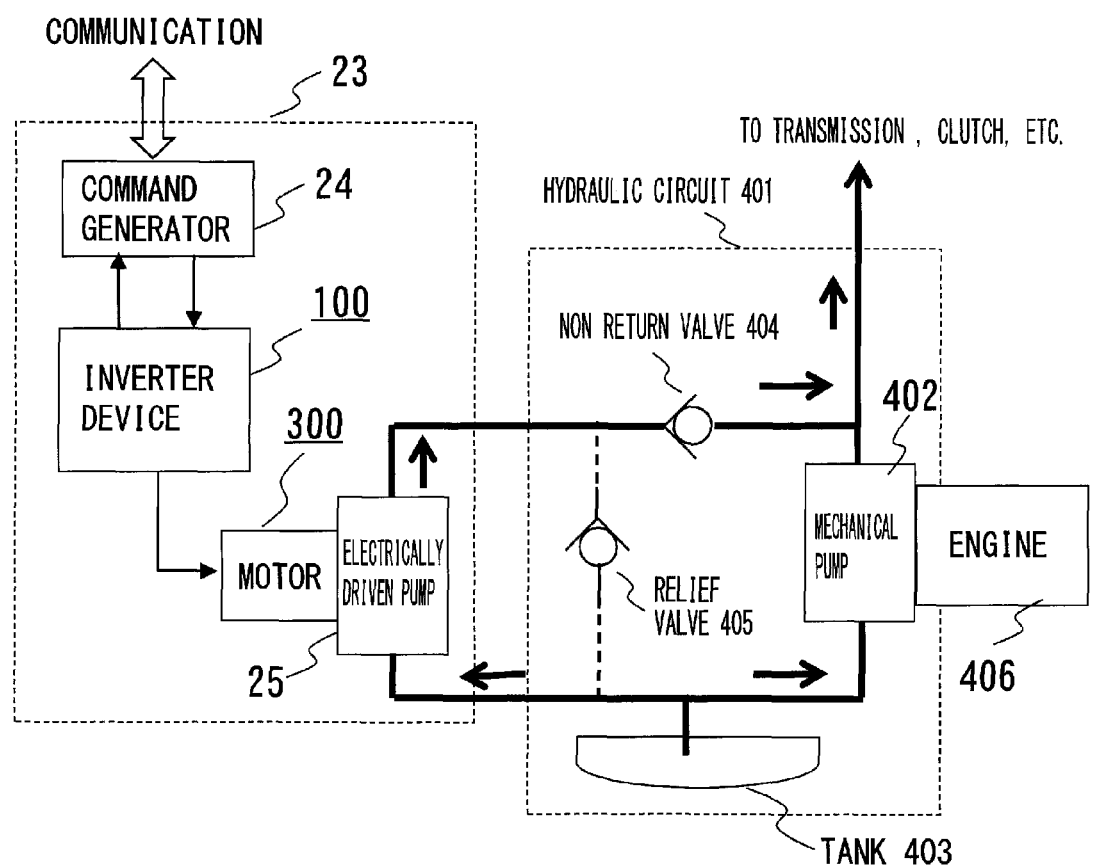
FIG. 16 is a figure showing the structure of an electrically driven pump device according to a fifth embodiment of the present invention.

Next, a fifth embodiment of the present invention will be explained. In this fifth embodiment, an electrically driven pump device for a vehicle will be explained to which an electric motor drive control device as described with reference to the first or the second embodiment is applied. FIG. 16 is a figure showing the structure of a hydraulic pressure pump system that includes an electrically driven pump device 23 according to this fifth embodiment of the present invention.

In the pump system shown in FIG. 16, the electrically driven pump device 23 is driven during idling stop of the automobile. Moreover, it would be acceptable for the electrically driven pump device 23 to be used, not only during idling stop, but also, when for example a vehicle like a hybrid automobile is being driven, to ensure hydraulic pressure to the transmission, the clutch, the brakes or the like of the automobile when the engine is completely stopped.

In FIG. 16, when the engine is stopped, the hydraulic pressure in a hydraulic circuit 401 is controlled by an electrically driven pump 25 that is incorporated in the electrically driven pump device 23. This electrically driven pump 25 is operated by an electric motor 300, and increases the pressure of the working fluid of the hydraulic circuit 401, in other words increases the hydraulic pressure. The electric motor 300 is driven under the control of an inverter device 100, and generates rotational torque for operating the electrically driven pump 25. And the inverter device 100 is controlled by a command generator 24. It should be understood that the inverter device 100 and the electric motor 300 are the same as those shown in FIGS. 1 and 12 of the first and the second embodiment.

The hydraulic circuit 401 comprises a mechanical pump 402 that is driven by power from an engine 406, a tank 403 that stores hydraulic fluid, a non-return valve that prevents reverse flow of hydraulic fluid from the mechanical pump 402 to the electrically driven pump 25, and a relief valve 405. It should be understood that this type of structure is per se well known as a structure for a hydraulic circuit. The hydraulic pressure generated by the hydraulic circuit 401 is supplied to a transmission or a clutch or the like of the vehicle.

When one of the phases on the output lines from the inverter device 100 to the electric motor 300 becomes missing, if due to this the operation of the electrically driven pump 25 ceases, the discharge pressure from the electrically driven pump 25 either will disappear completely or will become insufficient. In this case, sufficient hydraulic pressure will not be outputted from the hydraulic circuit 401 until the mechanical pump 402 operates and the hydraulic pressure that it produces rises. As a result, when idling stop ends or the like, there will not be enough hydraulic pressure for proper operation of the transmission and/or of the clutch, and there may be a delay in starting the vehicle off from rest, or a starting off shock may occur.

However, with the pump system shown in FIG. 16, a very important feature is that, even if as described above the phase upon one of the output lines becomes missing, the driving of the electric motor 300 is still continued and the electrically driven pump 25 continues to be operated, so that the supply of hydraulic pressure is still continued. Thus, by applying the present invention to the electrically driven pump device 23, even if one of the phases upon one of the output lines from the inverter device 100 to the electric motor 300 becomes missing, it is possible to detect this fact in an appropriate manner, and it is still possible to continue to operate the electrically driven pump 25 in a safe manner and thereby to continue supply of hydraulic pressure.

According to the fifth embodiment of the present invention as explained above, the electrically driven pump device comprises: the inverter device 100 which is an electric motor drive control device; the electrically driven pump 25 that increases the pressure of the working fluid, in other words the hydraulic pressure; and the electric motor 300 that is driven under the control of the inverter device 100, and that generates rotational torque for operating the electrically driven pump 25. Since these arrangements are provided, accordingly it is possible to continue supply of hydraulic pressure by the electrically driven pump 25 in a safe manner, even if one of the phases becomes missing while the electric motor 300 is being driven.

It should be understood that while, in the various embodiments explained above, examples of electric motor drive control devices that control the driving of three phase electric motors have been explained, the present invention could also be applied to controlling the driving of an electric motor of some other type. In other words, the present invention is not to be considered as being limited by the details of the embodiments described above; it can be applied to controlling the driving of an electric motor of some other type, provided that DC power is converted to multiphase AC power by an inverter circuit, and that this AC power is outputted to the electric motor.

Moreover, the various embodiments and variant examples explained above are only given by way of illustration; the present invention is not to be considered as being limited by the details thereof, provided that the essential characteristics of the present invention are not departed from. Thus, the present invention is not limited to the embodiments described above, and may be altered in various different ways, provided that its gist is preserved.

What is claimed is:

1. An electric motor drive control device that controls operation of an electric motor, comprising:
    an inverter circuit that converts DC power inputted via a DC bus to multiphase AC power and outputs the multiphase AC power to the electric motor;
    a current detector that detects a DC current flowing in the DC bus;
    a PWM generator that generates PWM signals for controlling the inverter circuit, and outputs the PWM signals to the inverter circuit;
    a current calculator that calculates a current value for each of phases to be flowed to the electric motor based upon a value of the DC current detected by the current detector and the PWM signals; and
    a current controller that generates a command signal for controlling the PWM generator based upon the current value for each of the phases calculated by the current calculator, and outputs the command signal to the PWM generator, wherein:
    if one of the phases of the AC power has become missing, the current calculator determines which phase is one that has become missing and calculates current values for other phases.

2. The electric motor drive control device according to claim 1, wherein:
    the current calculator determines which phase is the one that has become missing based upon at least either one of output voltages of the inverter circuit for the phases corresponding to the PWM signals and the DC current corresponding to the PWM signals.

3. The electric motor drive control device according to claim 2, further comprising:
    a neutral point voltage detection circuit that detects the neutral point voltage of the electric motor based upon the output voltages of the inverter circuit for the phasea, wherein:
    the current calculator determines which phase is the one that has become missing based upon the neutral point voltage detected by the neutral point voltage detection circuit.

4. The electric motor drive control device according to claim 3, wherein:
    the current calculator obtains a proper neutral point voltage, which is a theoretical value of the neutral point voltage of the electric motor, based upon a pulse pattern of the PWM signals, compares the neutral point voltage with the proper neutral point voltage, and determines which phase is the one that has become missing based upon a comparison result.

5. The electric motor drive control device according to claim 3, wherein:
    the current calculator compares the neutral point voltage with a plurality of threshold values that are set in advance, and determines which phase is the one that has become missing based upon a comparison result.

6. The electric motor drive control device according to claim 5, wherein:
    the plurality of threshold values includes a first threshold value, a second threshold value, and a third threshold value; and
    the current calculator selects the first threshold value, the second threshold value, or the third threshold value based upon a pulse pattern of the PWM signals, and compares the neutral point voltage with a selected threshold value.

7. The electric motor drive control device according to claim 1, wherein:
    a warning is issued if any one of the phases of the AC power has become missing.

8. An electrically driven power steering device, comprising:
    an electric motor drive control device according to claim 1;
    a transmission mechanism that transmits steering actuation by a driver of a vehicle to a steered wheel of the vehicle; and
    an electric motor that is driven under control of the electric motor drive control device, and that generates rotational torque for assisting the steering actuation.

9. An electrically driven brake device, comprising:
    an electric motor drive control device according to claim 1;
    a transmission mechanism that transmits brake actuation by a driver of a vehicle to a braking mechanism of the vehicle via a working fluid; and
    an electric motor that is driven under control of the electric motor drive control device, and that generates rotational torque for increasing a pressure of the working fluid according to the brake actuation.

10. An electrically driven pump device, comprising:
    an electric motor drive control device according to claim 1;
    a pump that increases a pressure of a working fluid; and
    an electric motor that is driven under control of the electric motor drive control device, and that generates rotational torque for operating the pump.

* * * * *